United States Patent
Yu

(10) Patent No.: US 9,252,618 B2
(45) Date of Patent: Feb. 2, 2016

(54) TERMINALS, TERMINAL SYSTEMS AND CHARGING/DISCHARGING METHODS THEREOF

(75) Inventor: Haifeng Yu, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 356 days.

(21) Appl. No.: 13/823,873

(22) PCT Filed: Sep. 29, 2011

(86) PCT No.: PCT/CN2011/080335
§ 371 (c)(1),
(2), (4) Date: Mar. 15, 2013

(87) PCT Pub. No.: WO2012/041242
PCT Pub. Date: Apr. 5, 2012

(65) Prior Publication Data
US 2013/0193906 A1    Aug. 1, 2013

(30) Foreign Application Priority Data
Sep. 29, 2010  (CN) .......................... 2010 1 0500393
Sep. 30, 2010  (CN) .......................... 2010 1 0501631

(51) Int. Cl.
*H02J 7/00* (2006.01)
(52) U.S. Cl.
CPC ............ *H02J 7/0068* (2013.01); *H02J 7/0054* (2013.01)
(58) Field of Classification Search
CPC ..................................................... H02J 7/0003
USPC .................................................. 320/103, 138
See application file for complete search history.

(56) References Cited

U.S. PATENT DOCUMENTS

| 7,166,988 | B2 * | 1/2007 | Maskatia | G06F 1/1616 320/116 |
| 2004/0195997 | A1 * | 10/2004 | Borrego Bel | H02J 7/1423 320/103 |
| 2007/0236408 | A1 * | 10/2007 | Yamaguchi | G06F 3/1431 345/1.1 |

FOREIGN PATENT DOCUMENTS

| CN | 1664751 A | 9/2005 |
| CN | 1776993 A | 5/2006 |

(Continued)

OTHER PUBLICATIONS

International Search Report for PCT Application No. PCT/CN2011/080335, dated Dec. 19, 2011.

(Continued)

*Primary Examiner* — Drew A Dunn
*Assistant Examiner* — Zixuan Zhou
(74) *Attorney, Agent, or Firm* — Westman, Champlin & Koehler, P.A.

(57) ABSTRACT

Terminals, terminal systems, charging/discharging methods for the terminals, charging/discharging methods for the terminal systems, and discharging methods are disclosed. The terminal is coupled to a second terminal including a second switching unit, a second charging unit and a second battery unit. The second charging unit is coupled to the second battery unit. The terminal includes a first switching unit and a first battery unit. The first switching unit is coupled to each of the second switching unit and the first battery unit. The first switching unit is configured to receive a control instruction or a control signal, and to switch to the second switching unit based on the control instruction or the control signal so as to supply power to the second terminal with the first battery unit, or switch to the second charging unit based on the control instruction or the control signal so as to charge the second battery unit with the first battery unit. Thus, the battery of the terminal can be used to charge the battery of the second terminal or used directly as a second battery for supplying power to the second terminal. This improves user convenience and usability of the terminals.

14 Claims, 18 Drawing Sheets

(56) References Cited

FOREIGN PATENT DOCUMENTS

| CN | 101115081 A | 1/2008 |
|----|-------------|--------|
| GB | 2352887 A | 2/2001 |

OTHER PUBLICATIONS

Written Opinion for PCT Application No. PCT/CN2011/080335, dated Dec. 28, 2011.

* cited by examiner

TERMINALS, TERMINAL SYSTEMS AND CHARGING/DISCHARGING METHODS THEREOF

CROSS-REFERENCE TO RELATED APPLICATION

This Application is a Section 371 National Stage Application of International Application No. PCT/CN2011/080335, filed 29 Sep. 2011 and published as WO 2012/041242 A1 on 5 Apr. 2012, in Chinese, the contents of which are hereby incorporated by reference in their entirety.

TECHNICAL FIELD

Embodiments of the present invention relate to terminal technologies, and more particularly, to terminals, terminal systems, charging/discharging methods for the terminals, charging/discharging methods for the terminal systems, and discharging methods.

BACKGROUND

With development of terminal technologies, a growing number of portable devices for personal computation have emerged, such as smart phone, notebook, and the like. These lightweight personal computing devices use a rechargeable battery to provide power for a time period. Due to size limitation, the provided rechargeable battery may be unable to supply enough power to meet the power requirements in a portable state. If the battery has been used up, and a user cannot charge the battery in time, the portable device cannot work, and its portability is degraded.

In view of the problem, a device capable of supplying power to the portable device has been introduced to the market. Currently, there are mainly two types of the device.

The first type of the device is a battery extension dock of a notebook computer. Coupling an extension dock to the notebook computer equals to coupling a second battery to the notebook computer. The battery in the extension dock can supply power only to the notebook computer. The notebook computer can obtain the status information of the battery in the extension dock, but cannot use the battery to charge the battery installed in the notebook computer. Thus, the user has to carry the extension dock in addition to the notebook computer, in order to use the power in the extension dock. This is inconvenient for the user.

The second type of the device is an external battery charger for mobile phone and the like. The battery charger is coupled to the mobile phone. That is, a charger is coupled to the mobile phone, and the electric power stored in the battery of the external battery charger can be used to charge the battery installed in the mobile phone. However, there is a problem that the mobile phone cannot obtain status information of the battery in the external battery charger, such as remaining power level, temperature, and voltage. Further, there is no power supply strategy, and the battery in the mobile phone will be changed as soon as the external battery charger is coupled. Such charging process causes loss in electric power.

During research and practice of the conventional schemes, the inventor has found that although the conventional schemes, either the extension dock or the external battery charger, can supply power to the notebook computer, the extension dock cannot be used to charge the computer's battery, and thus the user has to additionally carry the extension dock when going out. This causes inconvenience to the user. Although the external battery charger can charge the battery of the mobile phone, the mobile phone cannot obtain status information of the battery in the external battery charger, which will compromise convenience for the user.

SUMMARY

Embodiments of the present invention provide terminals, terminal systems, charging/discharging methods for the terminals, charging/discharging methods for the terminal systems, and discharging methods, in which a battery of a terminal can be used to charge a battery of another terminal or used as a second battery for supplying power to the another terminal, when the two terminals are coupled together. This improves user convenience and usability of the terminals.

An embodiment of the present invention provides a terminal coupled to a second terminal comprising a second switching unit, a second charging unit and a second battery unit, wherein the second charging unit is coupled to the second battery unit, the terminal comprises a first switching unit and a first battery unit, wherein the first switching unit is coupled to each of the second switching unit and the first battery unit, wherein the first switching unit is configured to receive a control instruction or a control signal, and to switch to the second switching unit based on the control instruction or the control signal so as to supply power to the second terminal with the first battery unit, or switch to the second charging unit based on the control instruction or the control signal so as to charge the second battery unit with the first battery unit.

A further embodiment of the present invention provides a terminal system comprising a first hardware system and a second hardware system, the first hardware system comprises a first switching unit and a first battery unit coupled with each other, and the second hardware system comprises a second switching unit, a second charging unit and a second battery unit, wherein each of the second switching unit and the second charging unit is coupled to the first switching unit, and the second charging unit is further coupled to the second battery unit, the first switching unit is configured to receive a control instruction or a control signal, and to switch to the second switching unit or the second charging unit based on the control instruction or the control signal;

the second switching unit is configured to, when switching to the first switching unit, supply power to the second hardware system with the first battery unit; and the second charging unit is configured to, when switching to the first switching unit, charging the second battery unit with the first battery unit, A still further embodiment of the present invention provides a terminal coupled to a first terminal comprising a first switching unit and a first battery unit coupled with each other, the terminal comprises a second processing unit, a second switching unit, a second charging unit and a second battery unit, the second processing unit is coupled to each of the second battery unit, the first battery unit and the second switching unit, the second charging unit is coupled to each of the second battery unit and the first switching unit, and the second switching unit is coupled to the first switching unit, wherein the second processing unit is configured to obtain a first status information of the first battery unit, obtain a second status information of the second battery unit, and based on the first status information and/or the second status information, to control the first switching unit to switch to the second switching unit so as to supply power to the terminal with the first battery unit, or to control the first switching unit to switch to the second charging unit so as to charge the second battery unit with the first battery unit, or to control the first switching unit to switch to the second charging unit so as to charge the first battery unit with the second battery unit.

Another embodiment of the present invention provides a charging/discharging method for a terminal coupled to a second terminal and comprising a first switching unit and a first battery unit coupled with each other, the second terminal comprises a second switching unit, a second charging unit and a second battery unit, the second charging unit is coupled to each of the first switching unit and the second battery unit, the second switching unit is coupled to the first switching unit, wherein the method comprises:

receiving, by the first switching unit, a control instruction or a control signal, and switching to the second switching unit based on the control instruction or the control signal so as to supply power to the second terminal with the first battery unit, or switching to the second charging unit based on the control instruction or the control signal so as to charge the second battery unit with the first battery unit.

A yet further embodiment of the present invention provides a charging/discharging method for a terminal system comprising a first hardware system and a second hardware system, the first hardware system comprises a first switching unit and a first battery unit coupled with each other, and the second in hardware system comprises a second switching unit, a second charging unit and a second battery unit, wherein each of the second switching unit and the second charging unit is coupled to the first switching unit, and the second charging unit is further coupled to the second battery unit, wherein the method comprises:

receiving, by the first switching unit, a control instruction or a control signal, and switching to the second switching unit or the second charging unit based on the control instruction or the control signal;

supplying, by the second switching unit when switching to the first switching unit, power to the second hardware system with the first battery unit; and charging, by the second charging unit when switching to the first switching unit, the second battery unit with the first battery unit.

A still further embodiment of the present invention provides a charging/discharging method for a terminal coupled to a first terminal comprising a first switching unit and a first battery unit coupled with each other, the terminal comprises a second processing unit, a second switching unit, a second charging unit and a second battery unit, the second processing unit is coupled to each of the second battery unit, the first battery unit and the second switching unit, the second charging unit is coupled to each of the second battery unit and the first switching unit, and the second switching unit is coupled to the first switching unit, wherein the method comprises:

obtaining, by the second processing unit, a first status information of the first battery unit, obtaining a second status information of the second battery unit, and based on the first status information and/or the second status information, controlling the first switching unit to switch to the second switching unit so as to supply power to the terminal with the first battery unit, or controlling the first switching unit to switch to the second charging unit so as to charge the second battery unit with the first battery unit, or controlling the first switching unit to switch to the second charging unit so as to charge the first battery unit with the second battery unit.

An embodiment of the present invention also provides a discharging method for a terminal coupled to a second terminal and comprising a first battery unit, the second terminal comprises a second battery unit and a second charging unit, the method comprises:

receiving, by the terminal, a control instruction or a control signal;

based on the control instruction or the control signal, using, by the terminal, the first battery unit to supply power to the second terminal, or using the second charging unit to charge the second battery unit of the second terminal.

With the embodiments of the present invention, when a terminal is coupled to a second terminal, it is possible to select a battery of the terminal to charge the second terminal, or directly use the battery of the terminal as a second battery of the second terminal for power supply, in accordance with some predefined policy or user operation.

DETAILED DESCRIPTION OF THE EMBODIMENTS

In the following, embodiments of the present invention will be further explained with reference to the figures, for a better understanding of the present invention by those skilled in the art.

Figure 1:
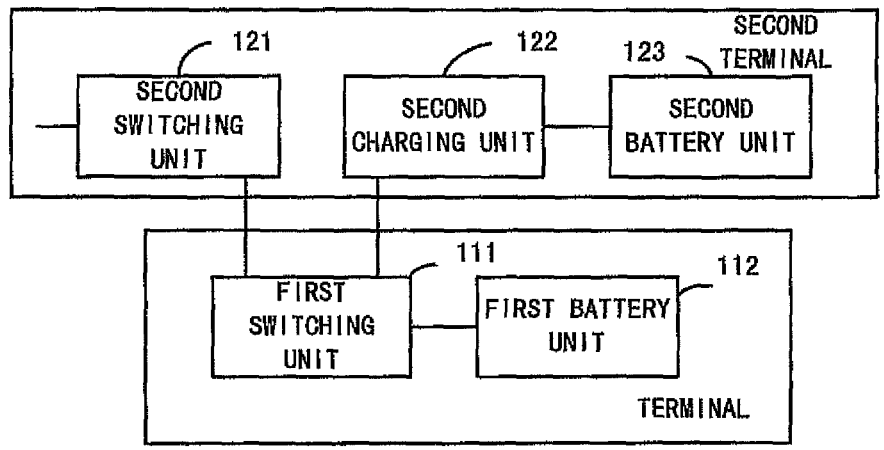
FIG. 1 is a schematic block diagram of a terminal according to the first embodiment of the present invention.

Referring to FIG. 1, a schematic block diagram of a terminal according to the first embodiment of the present invention is shown. The terminal 11 is coupled to a second terminal 12 including a second switching unit 121, a second charging unit 122 and a second battery unit 123. The second charging unit 122 is coupled to the second battery unit 123. The terminal 11 includes a first switching unit 111 and a first battery unit 112. The first switching unit 111 is coupled to each of the second switching unit 121 and the first battery unit 112.

The first switching unit 111 is configured to receive a control instruction or a control signal, and to switch to the second switching unit 121 based on the control instruction or the control signal so as to supply power to the second terminal 12 with the first battery unit 112, or switch to the second charging unit 122 based on the control instruction or the control signal so as to charge the second battery unit 123 with the first battery unit 112.

The control signal may be any digital or analog signal capable of distinguishing two selection statues from each other.

In this embodiment, upon receiving the control instruction or signal, the first switching unit of the terminal may use the first battery unit to supply power to the second terminal, or may use the first battery unit to charge the second battery unit, based on the control instruction or signal. The control instruction or signal may be a manual triggering of the first switching unit, or a control instruction or signal received from some other unit, such as a first or second processing unit. In this embodiment, the first or second switching unit may be a switch.

In this embodiment and embodiments described below, the first battery unit should have a voltage higher than that of the second battery unit, i.e., there is a voltage difference between the battery units. If the voltage of the first battery unit is lower than that of the second battery unit, a step-up unit may be provided to step up the output voltage of the first battery unit to a level higher than the voltage of the second battery unit.

Figure 2:
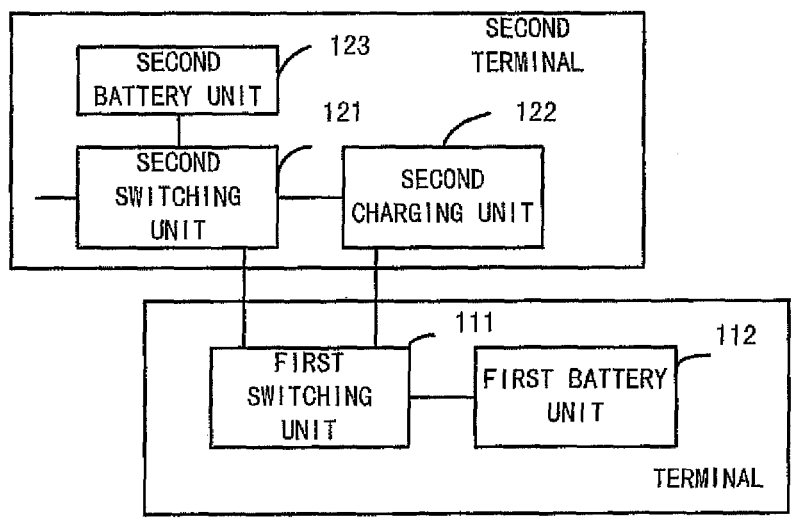
FIG. 2 is a schematic block diagram of a terminal according to the second embodiment of the present invention.

FIG. 2 shows a schematic block diagram of a terminal according to the second embodiment of the present invention. In the second embodiment, the second switching unit 121 is coupled to each of the second charging unit 122 and the second battery unit 123. Based on the received control instruction or signal, the first switching unit 111 switches to the second switching unit 121, and makes the second switching unit 121 connecting the second charging unit 122 with the second battery unit 123, so that the second charging unit 122 charges the second battery unit 123.

In this embodiment, connections among the second switching unit, the second battery unit and the second charging unit are changed. When the first switching unit switches to the second switching unit, and the second switching unit connects the second battery unit with the second charging unit, the second battery unit may be charged by the second charging unit using the first battery unit.

Figure 3:
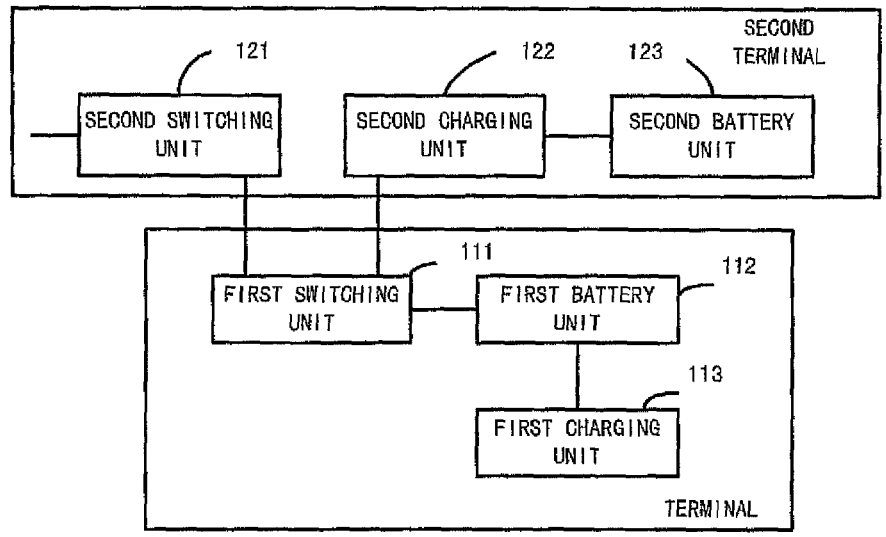
FIG. 3 is a schematic block diagram of a terminal according to the third embodiment of the present invention.
Figure 4:
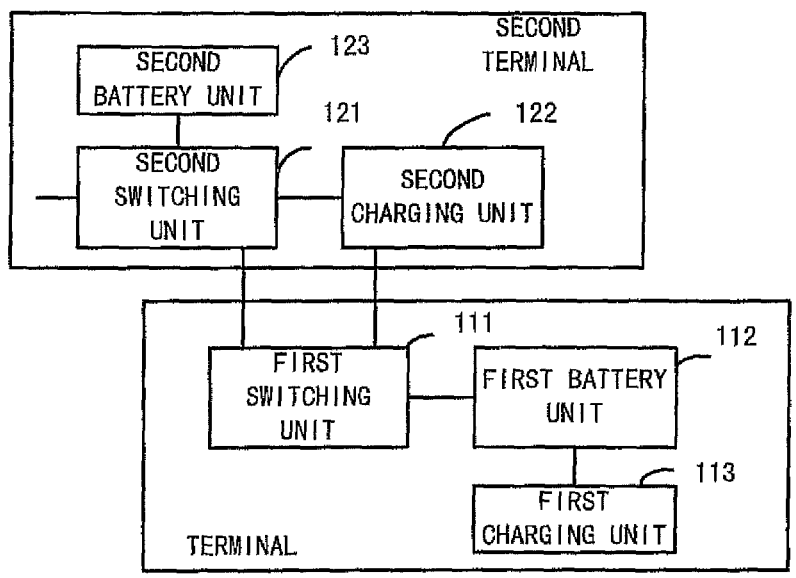
FIG. 4 is a schematic block diagram of a terminal according to the fourth embodiment of the present invention.

FIGS. 3 and 4 show schematic block diagrams of terminals according to the third and fourth embodiments of the present invention, respectively. In addition to the units in the embodiments of FIGS. 1 and 2, the terminal 11 further includes a first charging unit 113 coupled to the first battery unit 112 and configured to charge the first battery unit 112.

Figure 5:
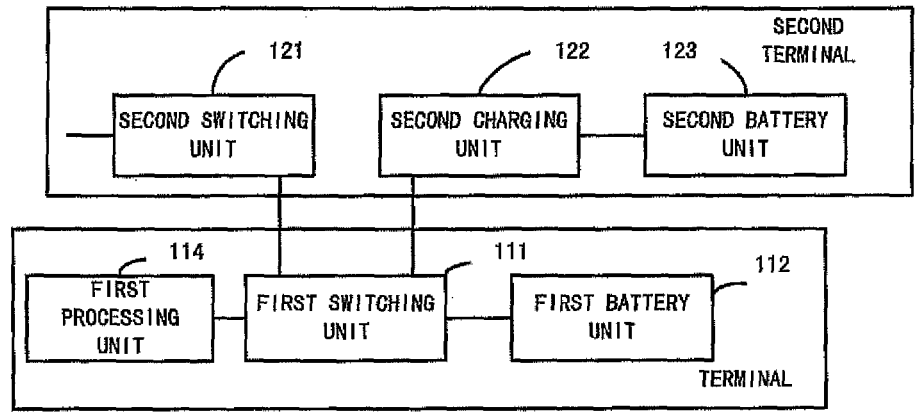
FIG. 5 is a schematic block diagram of a terminal according to the fifth embodiment of the present invention.
Figure 6:
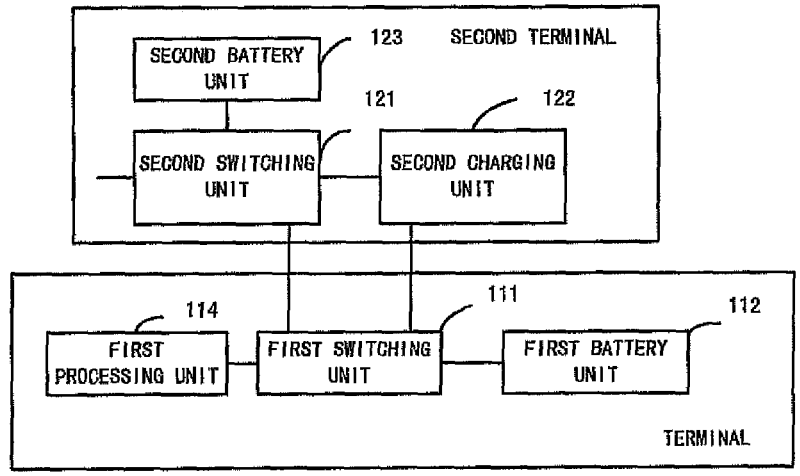
FIG. 6 is a schematic block diagram of a terminal according to the sixth embodiment of the present invention.

FIGS. 5 and 6 show schematic block diagrams of terminals according to the fifth and sixth embodiments of the present invention, respectively. In addition to the units in the embodiments of FIGS. 1 and 2, the terminal 11 further includes a first processing unit 114 coupled to the first switching unit 111 and configured to transmit a control instruction or signal to the first switching unit 111 according to a preset condition. One example of the preset condition is that the remaining power level of the first battery unit is lower than a preset first power level threshold, and the remaining power level of the second battery unit is higher than a preset second power level threshold. The present invention is not limited thereto.

Figure 7:
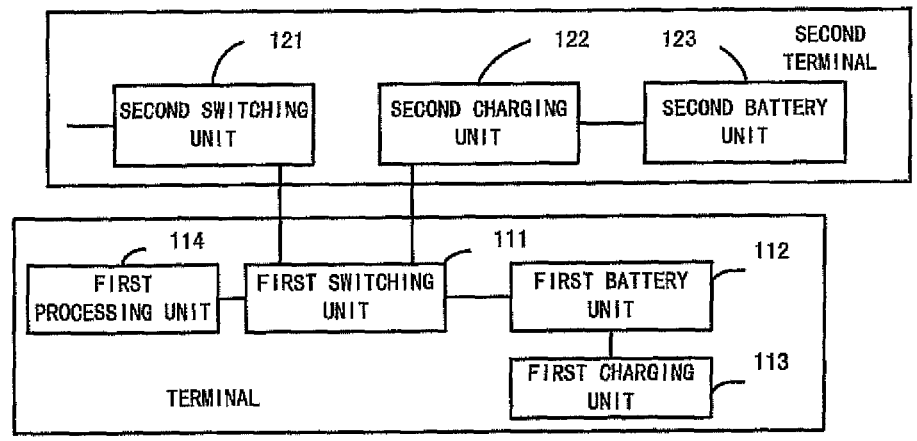
FIG. 7 is a schematic block diagram of a terminal according to the seventh embodiment of the present invention.
Figure 8:
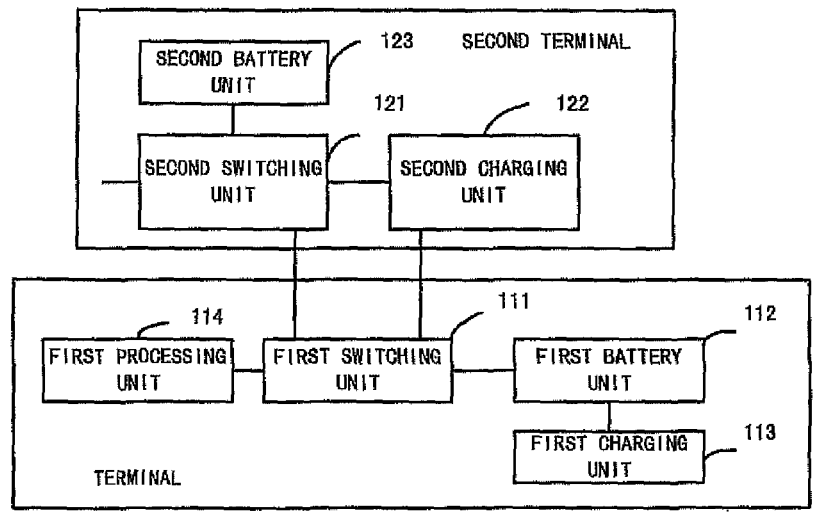
FIG. 8 is a schematic block diagram of a terminal according to the eighth embodiment of the present invention.

FIGS. 7 and 8 show schematic block diagrams of terminals according to the seventh and eighth embodiments of the present invention, respectively. In addition to the units in the embodiments of FIGS. 1 and 2, the terminal 11 further includes a first charging unit 113 coupled to the first battery unit 112, and a first processing unit 114 coupled to the first switching unit 111. The first processing unit 114 is configured to transmit a control instruction or signal to the first switching unit 111 according to a preset condition. The first charging unit 113 is configured to charge the first battery unit 112.

Figure 9:
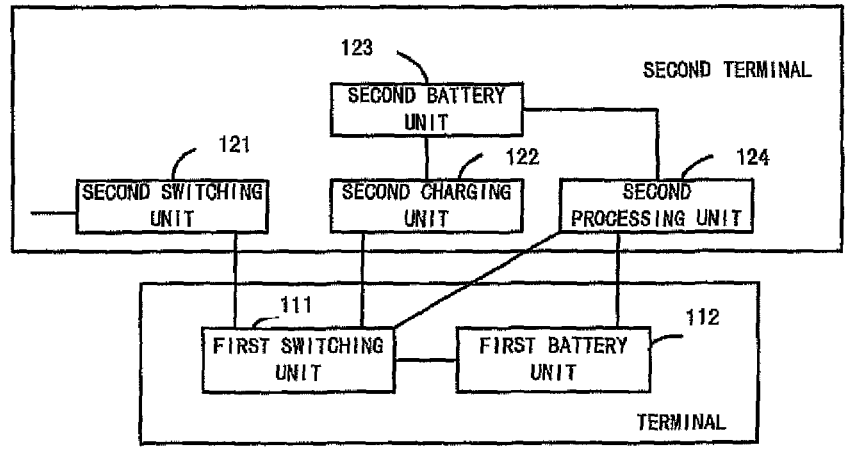
FIG. 9 is a schematic block diagram of a terminal according to the ninth embodiment of the present invention.
Figure 10:
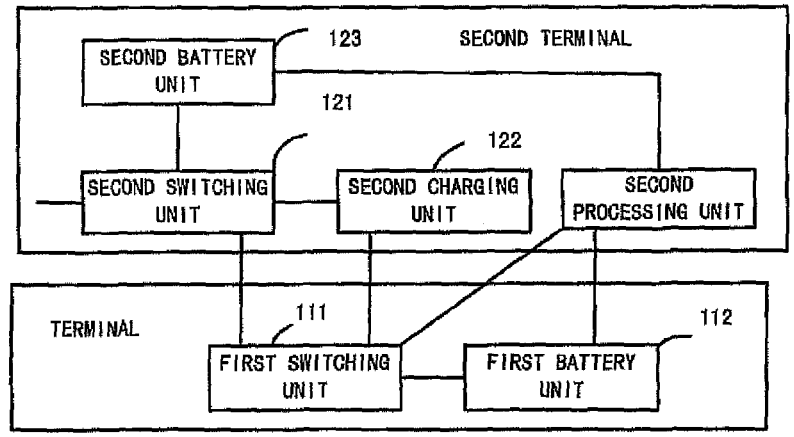
FIG. 10 is a schematic block diagram of a terminal according to the tenth embodiment of the present invention.

FIGS. 9 and 10 show schematic block diagrams of terminals according to the ninth and tenth embodiments of the present invention, respectively. In addition to the units in the embodiments of FIGS. 1 and 2, the second terminal 12 further includes a second processing unit 124 coupled to each of the second battery unit 123, the first battery unit 112 and the first switching unit 111, and configured to obtain a first status information of the first battery unit 112 and a second status information of the second battery unit 123, and transmit a control instruction or signal to the first switching unit 111 based on the first and/or second status information.

Figure 11:
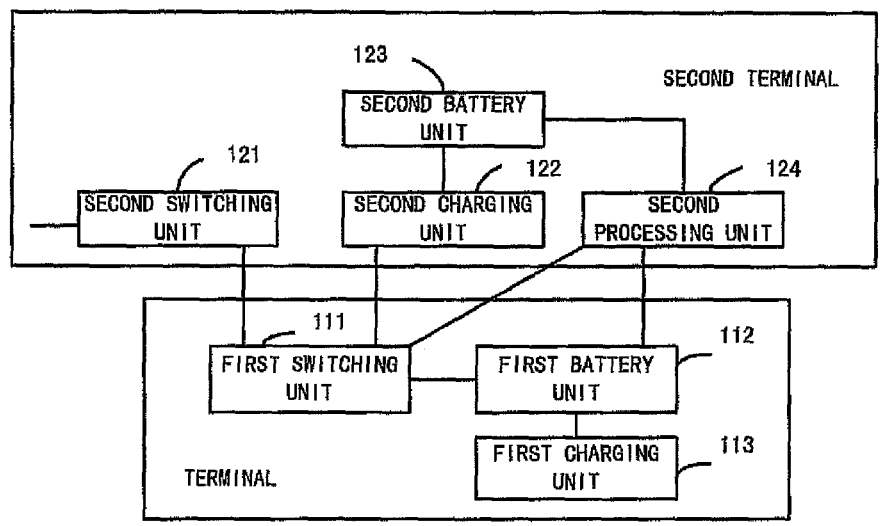
FIG. 11 is a schematic block diagram of a terminal according to the eleventh embodiment of the present invention.
Figure 12:
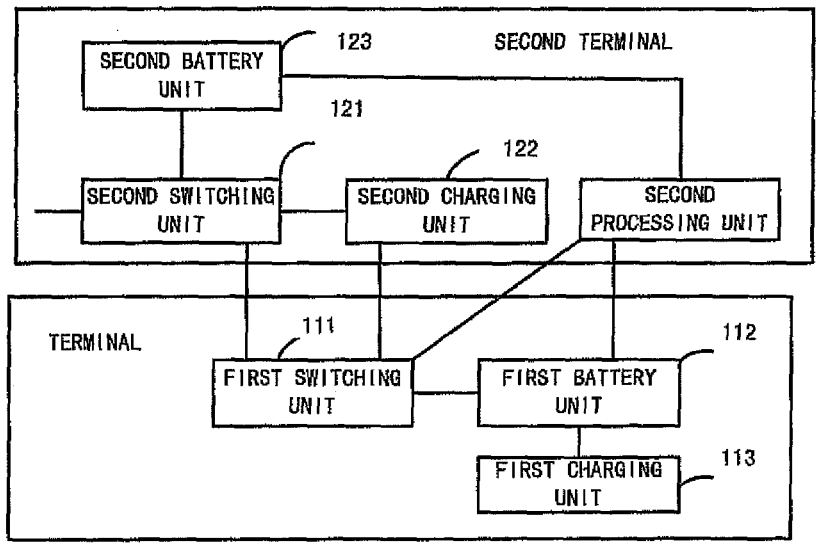
FIG. 12 is a schematic block diagram of a terminal according to the twelfth embodiment of the present invention.

FIGS. 11 and 12 show schematic block diagrams of terminals according to the eleventh and twelfth embodiments of the present invention, respectively. In addition to the units in the embodiments of FIGS. 3 and 4, the second terminal 12 further includes a second processing unit 124 coupled to each of the second battery unit 123, the first battery unit 112 and the first switching unit 111, and configured to obtain a first status information of the first battery unit 112 and a second status information of the second battery unit 123, and transmit a control instruction or signal to the first switching unit 111 based on the first and/or second status information.

Figure 13:
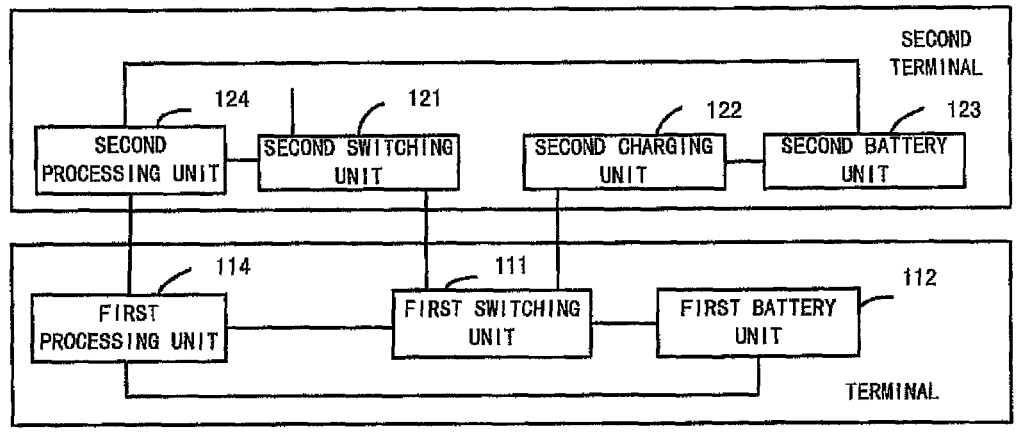
FIG. 13 is a schematic block diagram of a terminal according to the thirteenth embodiment of the present invention.
Figure 14:
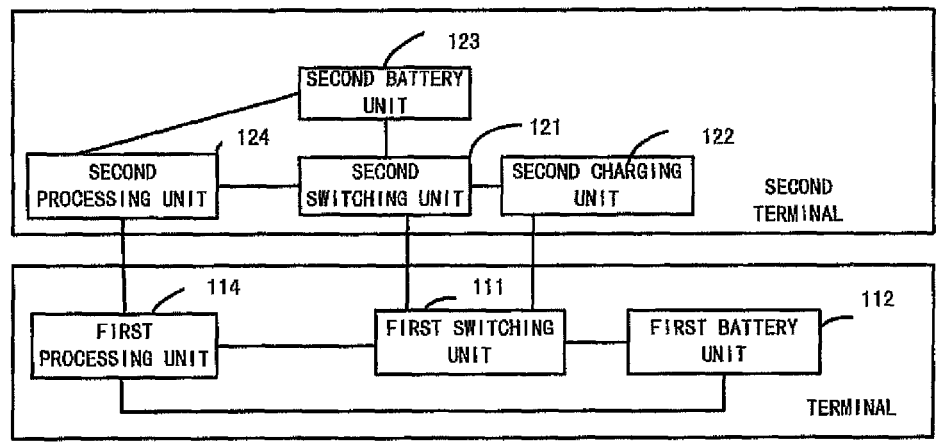
FIG. 14 is a schematic block diagram of a terminal according to the fourteenth embodiment of the present invention.

FIGS. 13 and 14 show schematic block diagrams of terminals according to the thirteenth and fourteenth embodiments of the present invention, respectively. In addition to the units in the embodiments of FIGS. 1 and 2, the second terminal 12 further includes a second processing unit 14 coupled to the second battery unit 123, and the terminal 11 further includes a first processing unit 114 coupled to each of the first battery unit 112 and the second switching unit 121, and configured to obtain a first status information of the first battery unit 112, obtain a second status information of the second battery unit 123 via the second processing unit 124, and transmit a control instruction or signal to the first switching unit 111 based on the first and/or second status information.

Figure 15:
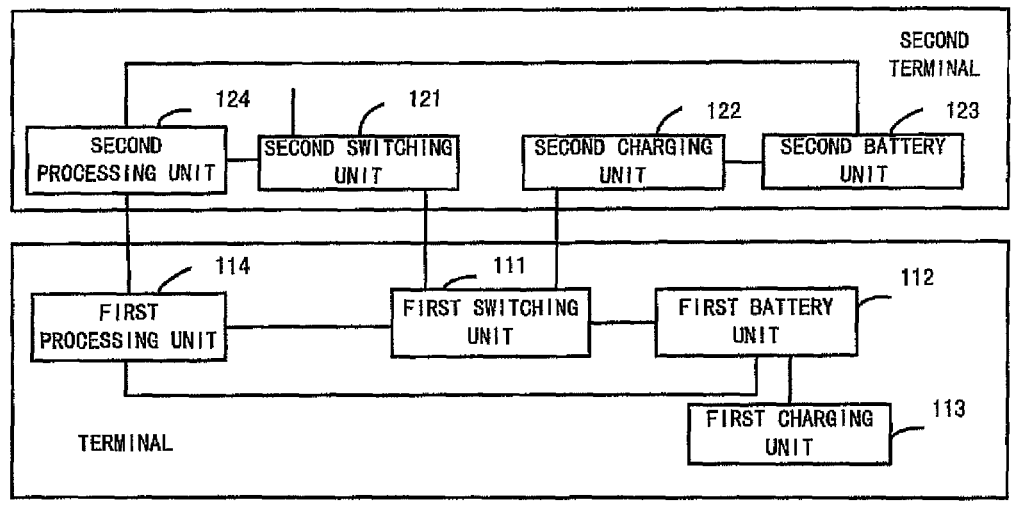
FIG. 15 is a schematic block diagram of a terminal according to the fifteenth embodiment of the present invention.
Figure 16:
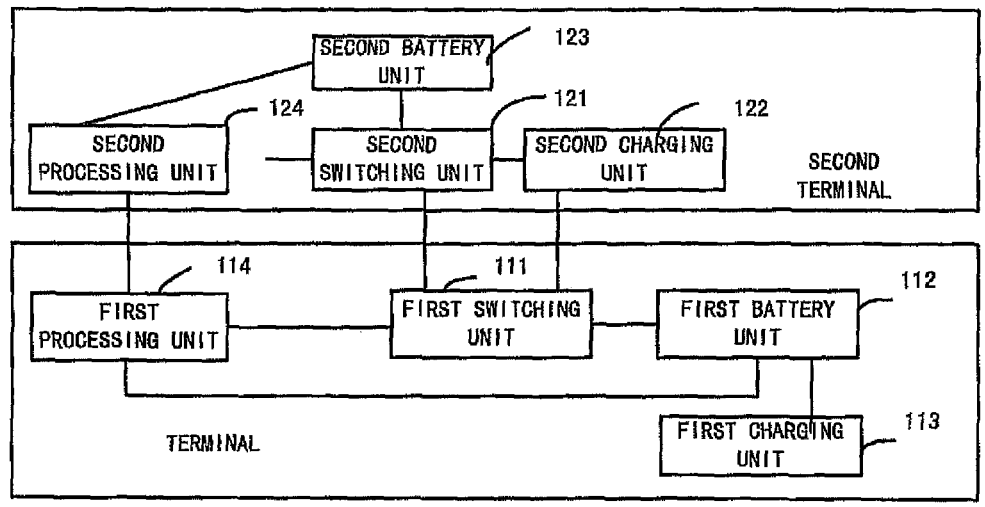
FIG. 16 is a schematic block diagram of a terminal according to the sixteenth embodiment of the present invention.

FIGS. 15 and 16 show schematic block diagrams of terminals according to the fifteenth and sixteenth embodiments of the present invention, respectively. In addition to the units in the embodiments of FIGS. 13 and 14, the second terminal 11 further includes a first charging unit 113 coupled to the first battery unit 112 and configured to charge the first battery unit 112.

In this embodiment, when the terminal and the second terminal, such as device B and device A, are coupled with each other, selection may be made according to a predefined policy or user operation so that the battery of device A is used to charge device B (e.g., a battery of a notebook computer), or used as a second battery of device B for power supply.

Further, device B may obtain status information of the battery of device A (e.g., remaining power level, temperature) and status of the battery of device B, and based on the status information of the two battery, select using which battery to supply power to device B or charging the battery of device B with the battery of device A.

An embodiment of the present invention provides a terminal system including a first hardware system and a second hardware system. The first hardware system includes a first switching unit and a first battery unit coupled with each other, and the second hardware system includes a second switching unit, a second charging unit and a second battery unit. Each of the second switching unit and the second charging unit is coupled to the first switching unit, and the second charging unit is further coupled to the second battery unit. The first switching unit is configured to receive a control instruction or a control signal, and to switch to the second switching unit or the second charging unit based on the control instruction or the control signal. The second switching unit is configured to, when switching to the first switching unit, supply power to the second hardware system with the first battery unit. The second charging unit is configured to, when switching to the first switching unit, charge the second battery unit with the first battery unit.

In this embodiment, the units included in the first hardware system are the same as those included in the terminal of the first embodiment, and the units included in the second hardware unit are the same as those in the second terminal. For details of these units, the schematic diagram of FIG. 1 may be referred to and the details will be omitted here.

Alternatively, the second switching unit may be coupled to each of the second charging unit and the second battery unit. The first switching unit may switch to the second switching unit based on the received control instruction or signal. The second switching unit is configured to, when switching to the first switching unit, connect the second charging unit with the second battery unit so that the second charging unit charges the second battery unit. This configuration is shown in a corresponding part of FIG. 2, and the details will be omitted here.

Alternatively, the second switching unit may be further configured to, when switching to the first switching unit, connect the second charging unit so that the second charging unit charges the first battery unit.

Alternatively, the first hardware system may further include a first charging unit coupled to the first battery and configured to charge the first battery unit, in addition to the units of FIG. 1 or 2. This configuration is shown in a corresponding part of FIG. 3 or 4, and the details will be omitted here.

Alternatively, the first hardware system may further include a first processing unit coupled to the first switching unit and configured to transmit a control instruction or signal to the first switching unit according to a preset condition, in addition to the units of FIG. 1 or 2. This configuration is shown in a corresponding part of FIG. 5 or 6, and the details will be omitted here.

Alternatively, in addition to the units of FIG. 1 or 2, the first hardware system may further include a first charging unit coupled to the first battery unit, and a first processing unit coupled to the first switching unit. The first processing unit transmits a control instruction or signal to the first switching unit according to a preset condition. The first charging unit charges the first battery unit. This configuration is shown in a corresponding part of FIG. 7 or 8, and the details will be omitted here.

Alternatively, in addition to the units of FIG. 1 or 2, the second hardware system may further include a second processing unit coupled to each of the second battery unit, the first battery unit and the first switching unit, and configured to obtain a first status information of the first battery unit and a second status information of the second battery unit, and transmit a control instruction or signal to the first switching unit based on the first and/or second status information. This configuration is shown in a corresponding part of FIG. 9 or 10, and the details will be omitted here.

Alternatively, in addition to the units of FIG. 3 or 4, the second hardware system may further include a second processing unit coupled to each of the second battery unit, the first battery unit and the first switching unit, and configured to obtain a first status information of the first battery unit and a second status information of the second battery unit, and transmit a control instruction or signal to the first switching unit based on the first and/or second status information. This configuration is shown in a corresponding part of FIG. 11 or 12, and the details will be omitted here.

Alternatively, in addition to the units of FIG. 1 or 2, the first hardware system may further include a first processing unit coupled to the first battery unit, and the second hardware system may further include a second processing unit coupled to the second battery unit. The first and second processing units may be coupled with each other. The first processing unit may be configured to obtain a first status information of the first battery unit, obtain a second status information of the second battery unit via the second processing unit, and transmit a control instruction or signal to the first switching unit based on the first and/or second status information. Alternatively, the second processing unit may be configured to obtain a second status information of the second battery unit, obtain a first status information of the first battery unit via the first processing unit, and transmit a control instruction or signal to the first switching unit based on the first and/or second status information. This configuration is shown in a corresponding part of FIG. 13 or 14, and the details will be omitted here.

Alternatively, in addition to the units of FIG. 13 or 14, the first hardware system may further include a first charging unit coupled to the first battery unit and configured to charge the first battery unit. This configuration is shown in a corresponding part of FIG. 15 or 16, and the details will be omitted here.

An embodiment of the present invention provides a terminal coupled to a first terminal including a first switching unit and a first battery unit coupled with each other. The terminal includes a second processing unit, a second switching unit, a second charging unit and a second battery unit. The second processing unit is coupled to each of the second battery unit, the first battery unit and the second switching unit, the second charging unit is coupled to each of the second battery unit and the first switching unit, and the second switching unit is coupled to the first switching unit. The second processing unit is configured to obtain a first status information of the first battery unit, obtain a second status information of the second battery unit, and based on the first status information and/or the second status information, to control the first switching unit to switch to the second switching unit so as to supply power to the terminal with the first battery unit, or to control the first switching unit to switch to the second charging unit so as to charge the second battery unit with the first battery unit, or to control the first switching unit to switch to the second charging unit so as to charge the first battery unit with the second battery unit.

In this embodiment, the units included in the terminal are the same as those included in the second terminal of the first embodiment, and the units included in the first terminal are the same as those included in the first terminal of the first embodiment. The configuration is shown in a corresponding part of FIG. 1, and the details thereof will be omitted.

Alternatively, the second switching unit may be coupled to each of the second charging unit and the second battery unit. The second processing unit may be configured to control the first switching unit to switch to the second switching unit, and make the second switching unit connect the second charging unit with the second battery unit, so that the second charging unit charges the second battery unit. This configuration is shown in a corresponding part of FIG. 2, and the details thereof will be omitted.

Figure 17:
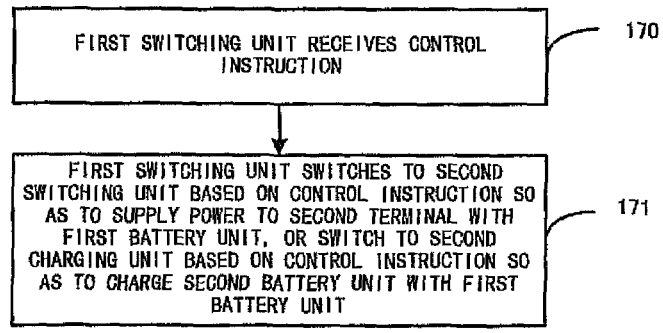
FIG. 17 is a flow chart of a charging/discharging method for a terminal according to an embodiment of the present invention.

Based on the above embodiments, the present invention also provides a charging/discharging method for a terminal. FIG. 17 shows a flow chart of the method. In the embodiment, the terminal is coupled to a second terminal. The terminal includes a first switching unit and a first battery unit coupled with each other. The second terminal includes a second switching unit, a second charging unit and a second battery unit. The second charging unit is coupled to each of the first switching unit and the second battery unit, and the second switching unit is coupled to the first switching unit. The method includes the following steps.

In step 170, the first switching unit receives a control instruction or a control signal.

In step 171, the first switching unit switches to the second switching unit based on the control instruction or the control signal so as to supply power to the second terminal with the first battery unit, or switch to the second charging unit based on the control instruction or the control signal so as to charge the second battery unit with the first battery unit.

Alternatively, the second switching unit may be coupled to each of the second charging unit and the second battery unit. The method may further include that the first switching unit, based on the control instruction or signal, switches to the second switching unit, and make the second switching unit connect the second charging unit with the second battery unit so that the second charging unit charges the second battery unit.

Alternatively, the terminal may further include a first charging unit coupled to the first battery unit. In this case, the method may further include charging the first battery unit by the first charging unit.

Alternatively, the terminal may further include a first processing unit coupled to the first switching unit. In this case, the first switching unit receives the control instruction or signal transmitted by the first processing unit according to a preset condition.

Alternatively, the terminal may further include a first charging unit coupled to the first battery unit, and a first processing unit coupled to the first switching unit. In this case, the first switching unit receives the control instruction or signal transmitted by the first processing unit according to a preset condition.

Alternatively, the method may further include charging the first battery unit by the first charging unit.

Alternatively, the second terminal may further include a second processing unit coupled to each of the second battery unit, the first battery unit and the first switching unit. In this case, the first switching unit receives a control instruction or signal transmitted by the second processing unit based on the obtained first status information of the first battery unit and/or second status information of the second battery unit.

Alternatively, the second terminal may further include a second processing unit coupled to the second battery unit, and the terminal may further include a first processing unit coupled to each of the first battery unit and the first switching unit. In this case, the first switching unit receives a control instruction or signal transmitted by the first processing unit based on the obtained first status information of the first battery unit and/or second status information of the second battery unit.

Alternatively, the terminal may further include a first charging unit coupled to the first battery unit. In this case, the method may further include charging the first battery unit by the first charging unit.

Figure 18:
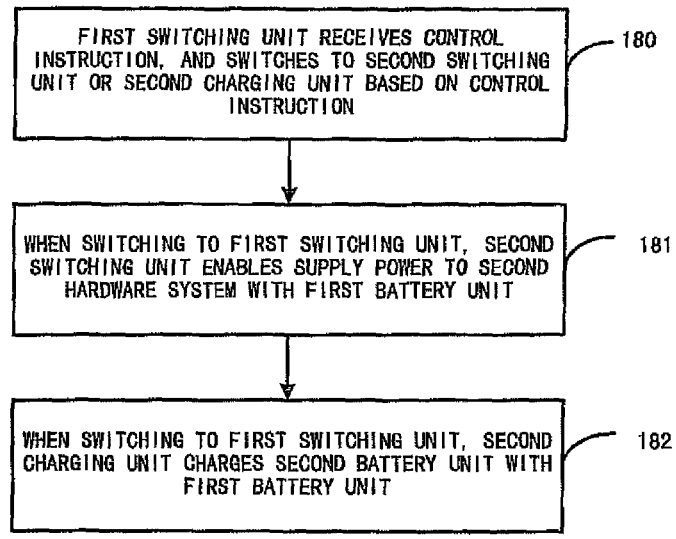
FIG. 18 is a flow chart of a charging/discharging method for a terminal system according to an embodiment of the present invention.

An embodiment of the present invention also provides a charging/discharging method for a terminal system. FIG. 18 shows a flow chart of the method. In the embodiment, the terminal system includes a first hardware system and a second hardware system. The first hardware system includes a first switching unit and a first battery unit coupled with each other, and the second hardware system includes a second switching unit, a second charging unit and a second battery unit. Each of the second switching unit and the second charging unit is coupled to the first switching unit, and the second charging unit is further coupled to the second battery unit. The method includes the following steps.

In step 180, the first switching unit receives a control instruction or a control signal, and switches to the second switching unit or the second charging unit based on the control instruction or the control signal.

In step 181, when switching to the first switching unit, the second switching unit enables supply power to the second hardware system with the first battery unit.

In step 182, when switching to the first switching unit, the second charging unit charges the second battery unit with the first battery unit.

Alternatively, when the second switching unit is coupled to each of the second charging unit and the second battery unit, the method may further include switching, by the first switching unit, to the second switching unit based on the received control instruction or signal, and connecting, by the second switching unit when switching to the first switching unit, the second charging unit with the second battery unit, so as to charge the second battery unit with the second charging unit.

Alternatively, the method may further includes connecting, by the second switching unit when switching to the first switching unit, the second charging unit so as to charge the first battery unit with the second charging unit.

Figure 19:
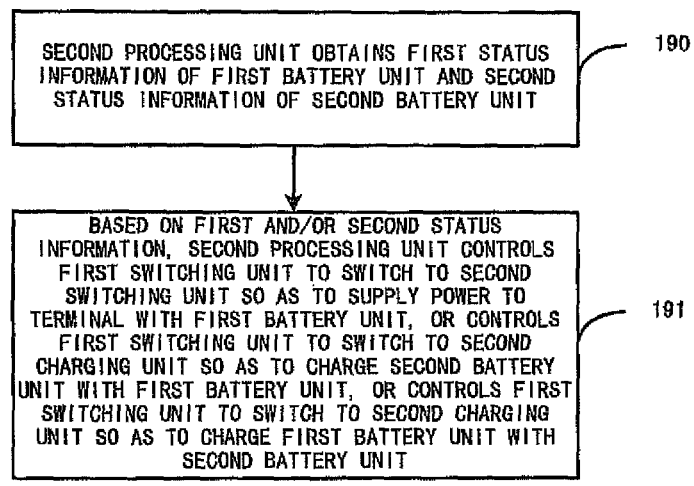
FIG. 19 is a flow chart of a further charging/discharging method for a terminal according to an embodiment of the present invention.

An embodiment of the present invention also provides a charging/discharging method for a terminal. FIG. 19 shows a flow chart of the method. In the embodiment, the terminal is coupled to a first terminal including a first switching unit and a first battery unit coupled with each other. The terminal includes a second processing unit, a second switching unit, a second charging unit and a second battery unit. The second processing unit is coupled to each of the second battery unit, the first battery unit and the second switching unit, the second charging unit is coupled to each of the second battery unit and the first switching unit, and the second switching unit is coupled to the first switching unit. The method includes the following steps.

In step 190, the second processing unit obtains first status information of the first battery unit and second status information of the second battery unit.

In step 191, based on the first status information and/or the second status information, the second processing unit controls the first switching unit to switch to the second switching unit so as to supply power to the terminal with the first battery unit, or controls the first switching unit to switch to the second charging unit so as to charge the second battery unit with the first battery unit, or controls the first switching unit to switch to the second charging unit so as to charge the first battery unit with the second battery unit.

Figure 20:
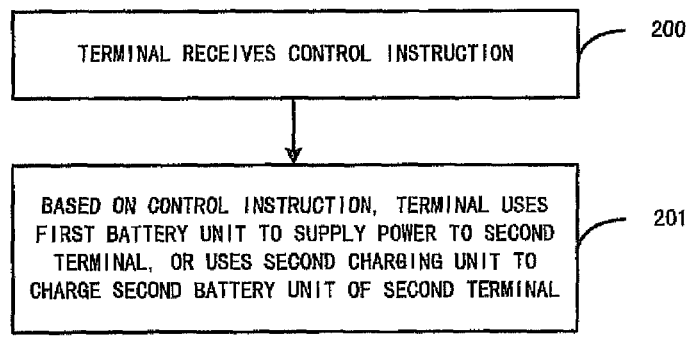
FIG. 20 is a flow chart of a discharging method according to an embodiment of the present invention.

An embodiment of the present invention also provides a discharging method for use in a terminal. FIG. 20 shows a flow chart of the method. In the embodiment, the terminal is coupled to a second terminal and includes a first battery unit. The second terminal includes a second battery unit and a second charging unit. The method includes the following steps.

In step 200, the terminal receives a control instruction or a control signal.

In step 201, based on the control instruction or the control signal, the terminal uses the first battery unit to supply power to the second terminal, or uses the second charging unit to charge the second battery unit of the second terminal.

Particularly, the terminal may receive the control instruction or signal transmitted upon a manual control operation. Alternatively, if the terminal includes a first processing unit, the terminal may receive the control instruction or signal transmitted by the first processing unit based on the obtained first status information of the first battery unit and/or second status information of the second battery unit. Alternatively, if the second terminal includes a second processing unit, the terminal may receive the control instruction or signal transmitted by the second processing unit based on the obtained first status information of the first battery unit and/or second status information of the second battery unit.

In all of the embodiments above described, any of the terminal, the second terminal, the first hardware system or the second hardware system may include an additional step-up unit. The step-up unit may be coupled to the first or second battery unit. If the second battery unit of the second terminal is charged with the first battery unit of the terminal, and the voltage of the first battery unit is lower than the voltage of the second battery unit, the step-up unit may be turned on to step up the voltage of the first battery unit to a level higher than that of the second battery unit, thereby facilitating charging the second battery unit with the first battery unit. Similarly, the step-up unit may be turned on to step up the voltage of the second battery unit to a level higher than that of the first battery unit, thereby facilitating charging the first battery unit with the second battery unit.

Below specific application examples are described as appreciated by those skilled in the art.

Figure 21:
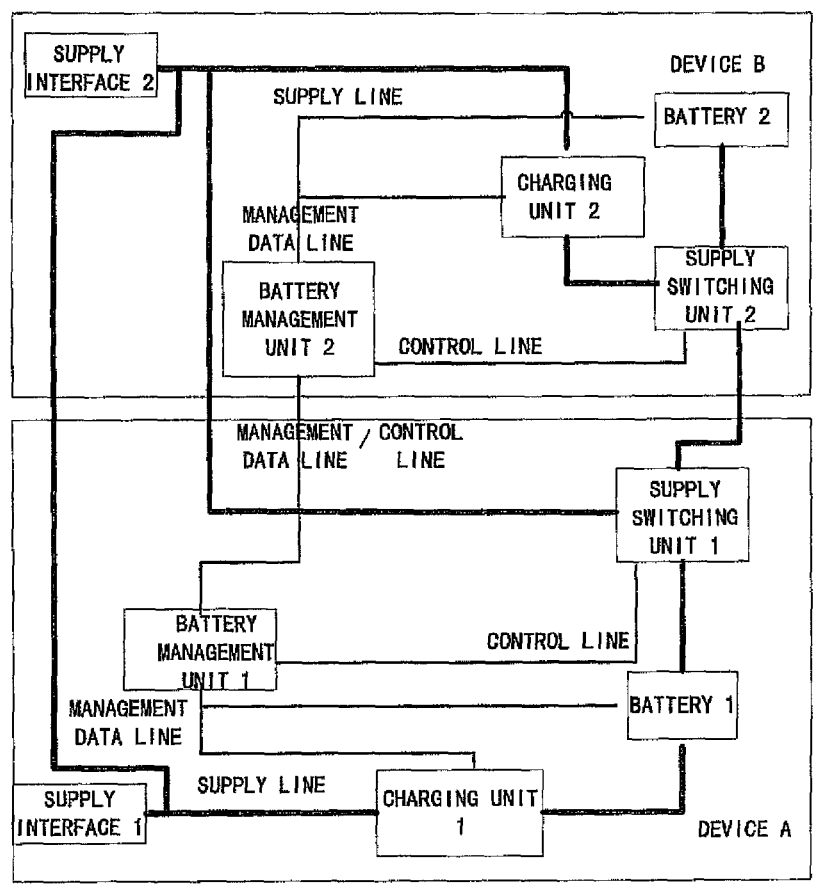
FIG. 21 is a logical block diagram showing devices A and B coupled with each other in an embodiment of the present invention.

FIG. 21 is a logical block diagram showing devices A and B coupled with each other in an embodiment of the present invention. In this embodiment, devices A and B may be coupled in various connection manners including wired, wireless or hybrid connection. The wired connection may refer to data and power transfer via a wired mechanism including a physical interface (e.g., slot-type or contact-type interface) and a physical line (e.g., a USB connection line). The wired connection is not limited thereto, but may include other types of connections. The wireless connection may refer to data and power transfer via a wireless mechanism including data transfer over Bluetooth, and wirelessly charging/discharging through electromagnetic sensing. The wireless connection is not limited thereto, but may include other types of connections. The hybrid connection may refer to transferring data wirelessly while transferring power over a wire, or transferring data over a wire while transferring power wirelessly.

In this example, device A may include a display unit, and may be operate independently, for example, as a tablet computer. Device B may be a device operating independently, such as a computer. Device B may be a device that cannot operate independently, such as a battery extension device. If device B is a stand-alone device and has no display unit, the display unit of device A may display content about operations of device B after devices A and B are coupled.

As shown in FIG. 21, devices A and B are coupled in a wired manner. However, the present invention is not limited thereto. In this example, a battery management unit, a battery charging unit, and a battery switching unit are used as examples of the processing unit, the charging unit, and the switching unit, respectively. In particular, the battery management unit 2 of device B may be coupled to the battery management unit 1 of device A via a control line or management data line. The control line may be a General Port Input Output (GPIO) line, and the data line may be I2C bus. The battery management unit 1 is coupled to the battery 2 via the management data line of device B, and also coupled to the battery 1 via the management data line of device A. The management data line may be a system management bus (SMBUS). The battery management unit 2 is coupled to the battery switching unit 2 via the control line of device B, and the battery management unit 1 is coupled to the battery switching unit 1 via the control line of device B. The charging unit 2 is coupled to each of the battery management unit 2, the battery switching unit 2 and the power supply interface 2. The charging unit 1 is coupled to each of the battery management unit 2, the battery switching unit 1 and the power supply interface 1. A USB connection may be used between the battery switching unit 2 and the battery 1, and between the battery switching unit 1 and the battery 2. The positive (BATT+) output of battery 2 is coupled to the battery switching unit 2 of device B, and the BATT+ output of the battery 1 is coupled to device A. Supply switching units 1 and 2 are coupled with each other, and supply switching unit 1 is further coupled to the connection between supply interface 2 and charging unit 2. Supply interface 2 of device B is coupled to a power supply, and also coupled to a connection between supply interface 1 and charging unit 1. In this way, an external power supply may be coupled to only supply interface 2 to provide power to both of devices A and B. Similarly, if supply interface 1 of device A is coupled to a power supply, and also coupled to a connection between supply interface 2 and charging unit 2, an external power supply may be coupled to only supply interface 1 to provide power to both of devices A and B.

Figure 22:
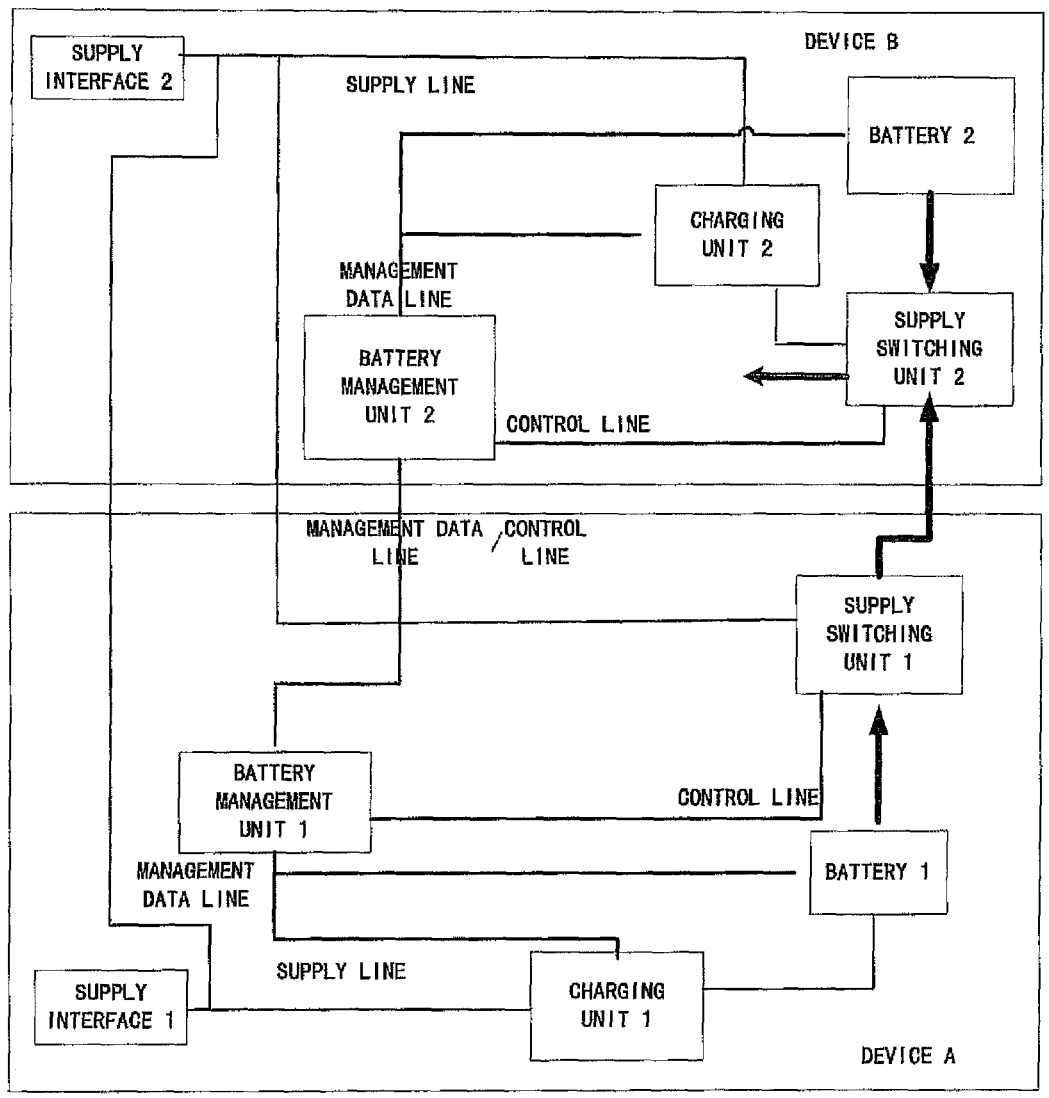
FIG. 22 is a logical block diagram showing that a battery of device B acts as a second battery of device A and discharges when devices A and B are incorporated in an embodiment of the present invention.

FIG. 22 is a logical diagram showing that the battery of device A acts as a second battery of device B when devices A and B join together in an embodiment of the present invention. In this embodiment, devices A and B join together, and battery 1 of device A acts as a second battery of device B. In this case, batty management unit 2 of device B controls supply switching unit 2 to switch to supply switching unit 1, or batty management unit 1 of device A controls supply switching unit 1 to switch to supply switching unit 2. Accordingly, it is possible to select one of battery 2 of device B and battery 1 of device A to supply power to device B, based on a certain policy. For example, batty management unit 2 controls supply switching unit 2 to switch to supply switching unit 1, which in turn switches to battery 1. In this way, battery 1 may supply power to device B or charge battery 2 of device B.

Figure 23:
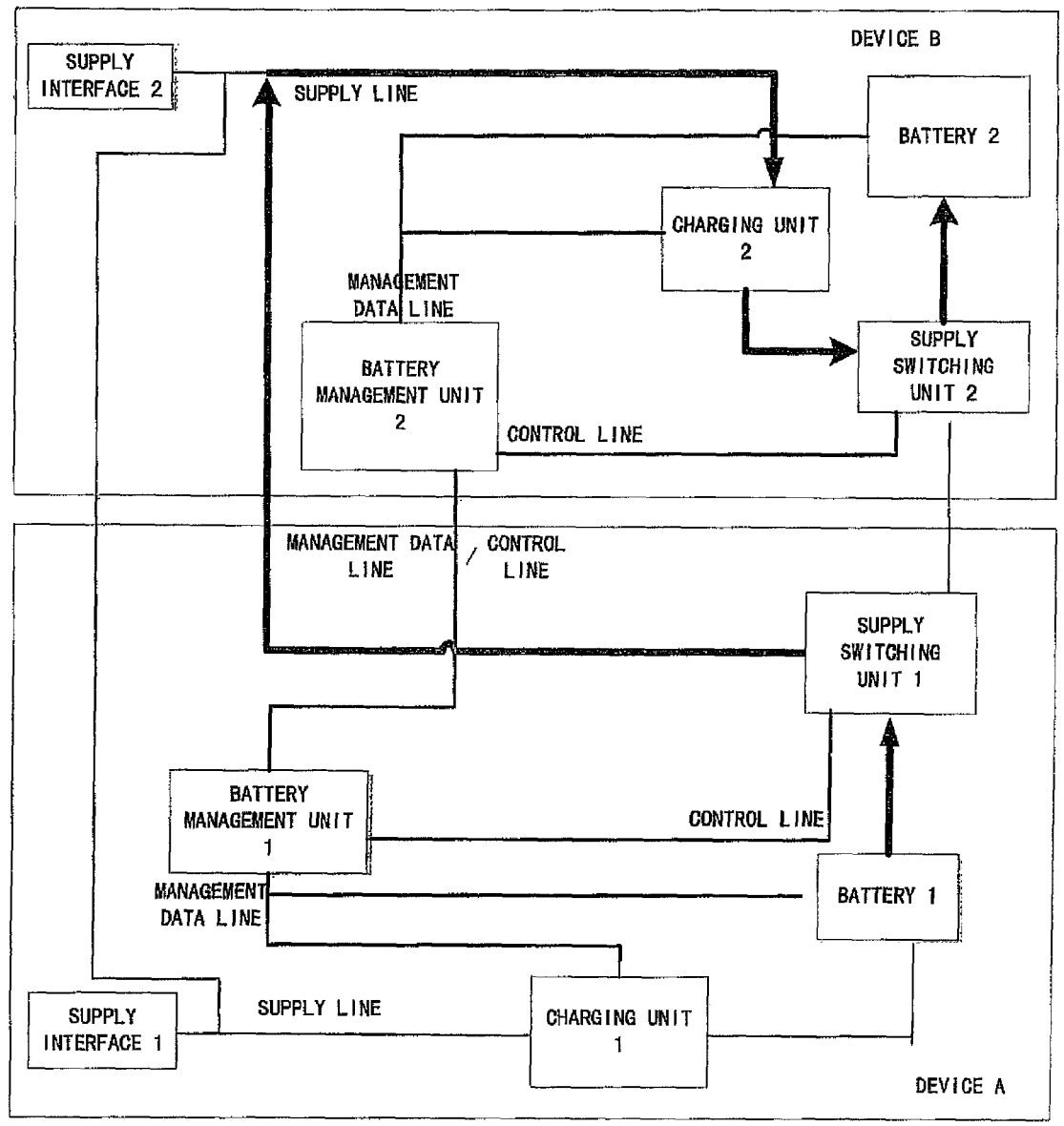
FIG. 23 is a logical block diagram showing that a battery of device B acts as a charging source of device A and discharges when devices A and B are incorporated in an embodiment of the present invention.

FIG. 23 is a logical diagram showing that the battery of device A acts as a charging source of device B when devices A and B join together in an embodiment of the present invention. In this embodiment, when devices A and B join together, battery 1 of device A acts as a charging source of device B. That is, battery 1 of device A not only supplies power to device B but also charges the battery of device B. As shown in the figure, upon receiving the control instruction or signal, the supply switching unit 1 switches to the charging unit 2, which in turn charges battery 2 with battery 1 via the supply switching unit 1. At the same time, power may be provided to device B via the supply switching unit 2.

Figure 24:
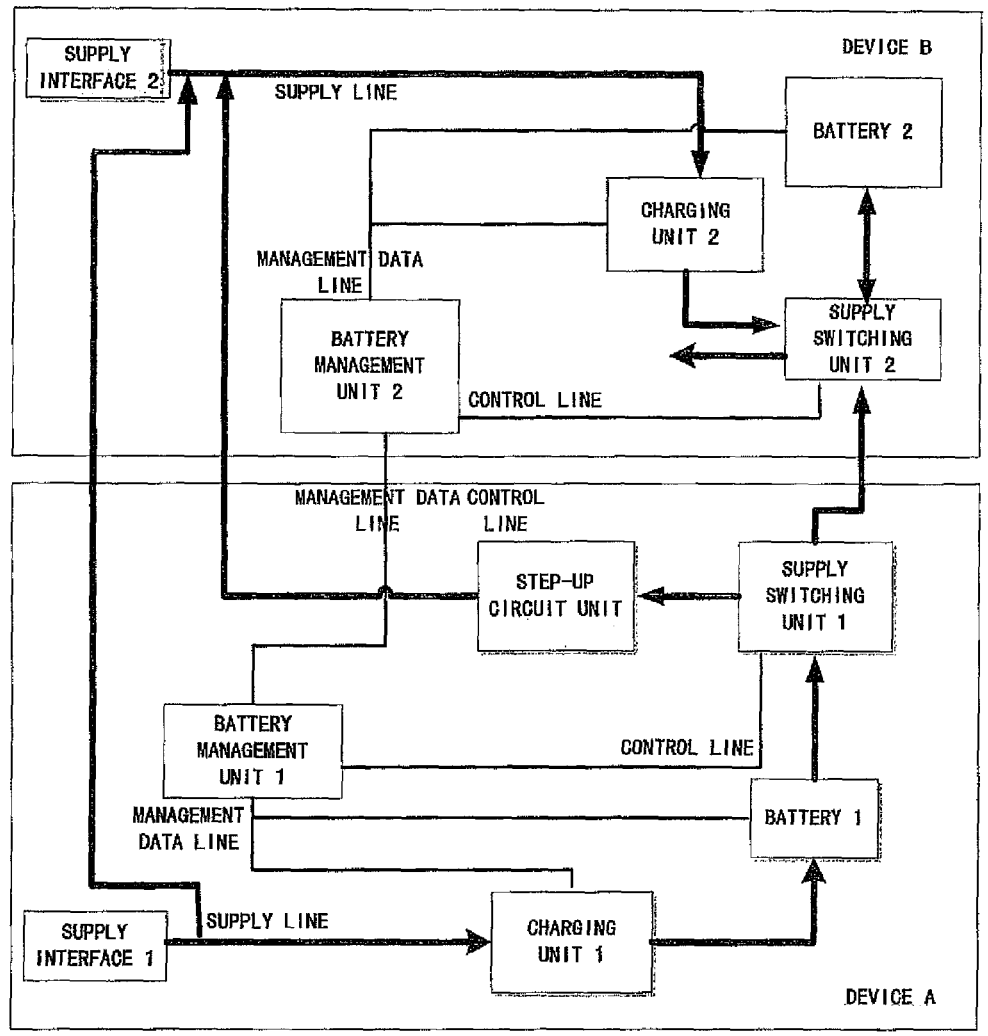
FIG. 24 is a logical block diagram showing that device B is added with a step-up unit in an embodiment of the present invention.
Figure 25:
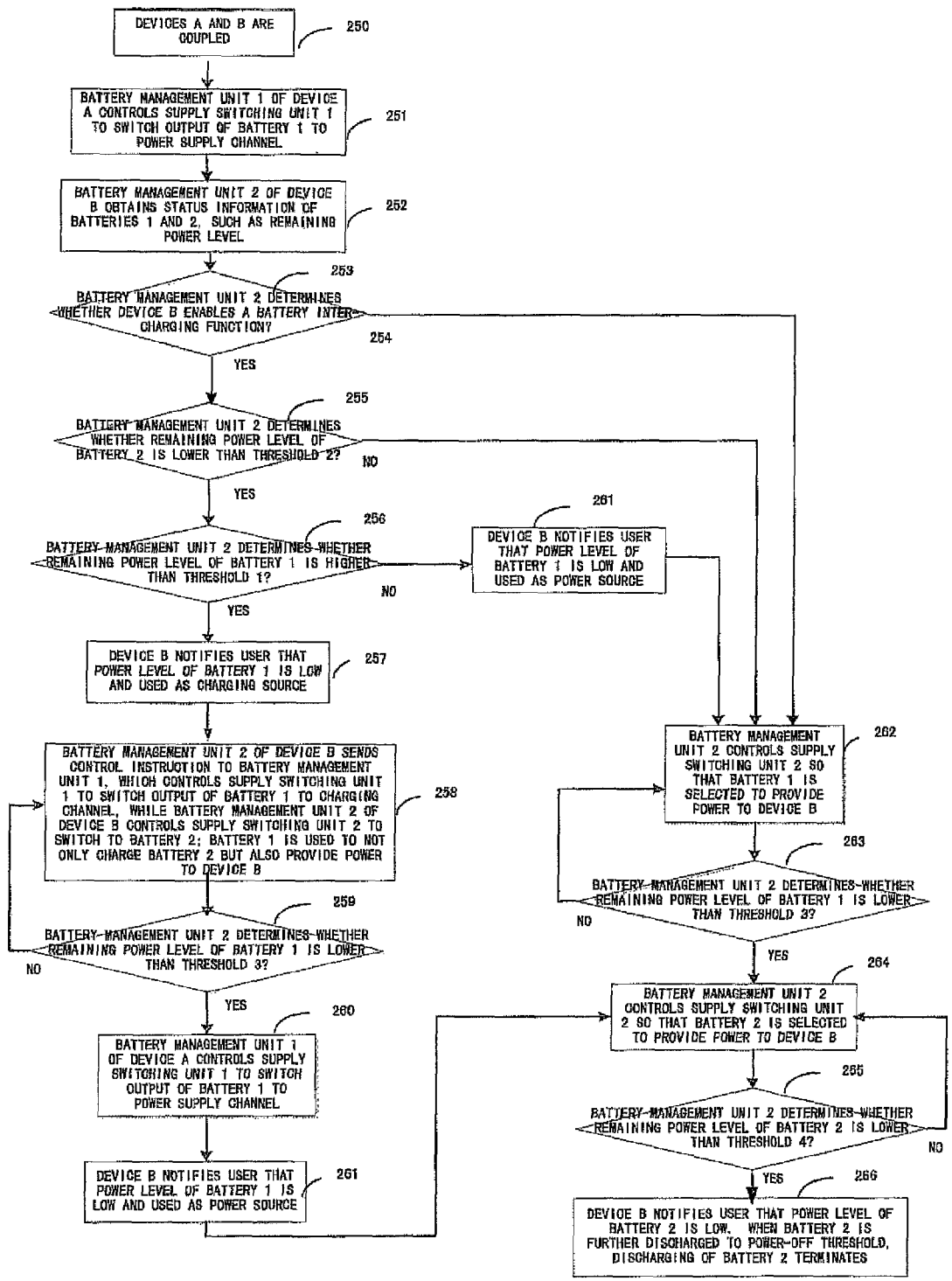
FIG. 25 is a flow chart of discharging when devices A and B are incorporated in an embodiment of the present invention.

FIG. 24 is a logical block diagram showing that device B is added with a step-up unit in an embodiment of the present invention. In this embodiment, when devices A and B join together, the battery management unit of device B obtains status information of battery 1 of device A, such as remaining power level, temperature and the like, through the battery management unit of device A. Then, a determination is made based on status information of battery 2 of device B, and charging/discharging is performed as shown in FIG. 25. FIG. 25 is a flow chart of discharging when devices A and B are incorporated in an embodiment of the present invention. In this embodiment, a user may control the discharging path of the battery of device A in any status.

In particular, the flow of FIG. 25 includes the following steps.

Step 250: devices A and B are coupled together.

Step 251: battery management unit 1 of device A controls supply switching unit 1 to switch output of battery 1 to a power supply channel.

Step 252: battery management unit 2 of device B obtains status information of batteries 1 and 2, such as remaining power level.

Step 253: battery management unit 2 determines whether device B enables a battery inter-charging function. If YES, the flow proceeds to step 254; otherwise, the flow proceeds to step 262.

Step 254: battery management unit 2 determines whether power level of battery 2 is lower than threshold 1. If YES, the flow proceeds to step 255; otherwise, the flow proceeds to step 262.

Step 255: battery management unit 2 determines whether remaining power level of battery 1 is higher than threshold 2. If YES, the flow proceeds to step 256; otherwise, the flow proceeds to step 262.

Step 256: device B notifies the user that the power level of battery 1 is low and will be used as charging source.

Step 257: battery management unit 2 of device B sends a control instruction or signal to battery management unit 1, which controls supply switching unit 1 to switch output of battery 1 to a charging channel. At the same time, battery management unit 2 of device B controls supply switching unit 2 to switch to battery 2. In this way, battery 1 is used to not only charge battery 2 but also provide power to device B.

Step 258: battery management unit 2 determines whether remaining power level of battery 1 is lower than threshold 3. If YES, the flow proceeds to step 259; otherwise, the flow proceeds to step 257.

Step 259: battery management unit 1 of device A controls supply switching unit 1 to switch output of battery 1 to the power supply channel.

Step 260: device B notifies the user that the power level of battery 1 is low and will be used as power source. Then, the flow proceeds to step 264.

Step 261: device B notifies the user that the power level of battery 1 is low and will be used as power source. Then, the flow proceeds to step 262.

Step 262: battery management unit 2 controls supply switching unit 2 so that battery 1 is selected to provide power to device B.

Step 263: battery management unit 2 determines whether remaining power level of battery 1 is lower than threshold 3. If YES, the flow proceeds to step 264; otherwise, the flow returns to step 262.

Step 264: battery management unit 2 controls supply switching unit 2 so that battery 2 is selected to provide power to device B.

Step 265: battery management unit 2 determines whether remaining power level of battery 2 is tower than threshold 4. If YES, the flow proceeds to step 266; otherwise, the flow returns to step 264.

Step 266: device B notifies the user that the power level of battery 2 is low. When battery 2 is further discharged to a power-off threshold, discharging of battery 2 terminates.

In the present embodiment, when devices A and B join together, selection can be made according to a predefined policy or the user's operation, so that battery of device A is used to charge battery of device B (e.g., battery of a notebook computer), or directly used as a second battery for providing power to device B.

In addition, device B can obtain battery status information of device A, such as remaining power level or temperature, and battery status information of device B. Selection can be made based on the obtained battery status information to determine which of the batteries will provide power to device B, or to control battery of device A to charge battery of device B.

Figure 26:
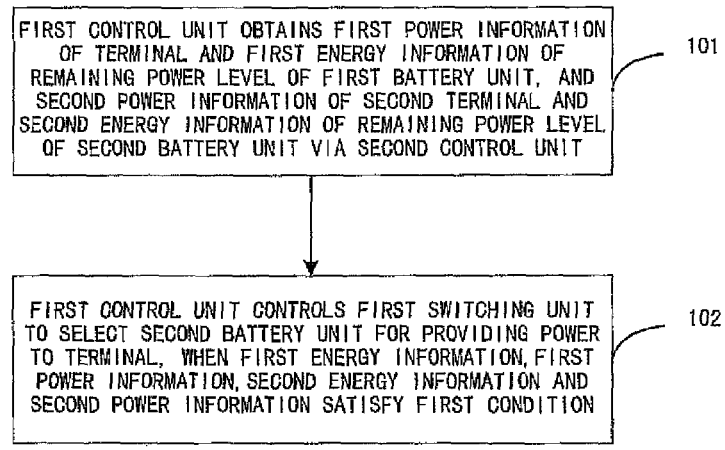
FIG. 26 is a flow chart of a method for supplying power to a terminal according to an embodiment of the present invention.

FIG. 26 is a flow chart of a method for supplying power to a terminal according to an embodiment of the present invention. In this embodiment, the terminal is coupled to a second terminal including a second control unit and a second battery unit coupled to the second control unit. The terminal includes a first control unit, a first switching unit and a first battery unit. The first control unit is coupled to each of the second control unit, the first switching unit and the first battery unit. The first switching unit is coupled to each of the first battery unit and the second battery unit. The method includes the following steps.

Step 101: the first control unit obtains first power information of the terminal and first energy information about remaining power level of the first battery unit. The first control unit also obtains, via the second control unit, second power information of the second terminal and second energy information about remaining power level of the second battery unit.

Step 102: the first control unit controls the first switching unit to select the second battery unit for providing power to the terminal, when the first energy information, the first power information, the second energy information and the second power information satisfy a first condition.

In this embodiment, when the first energy information, the first power information, the second energy information and the second power information obtained by the terminal satisfy the first condition, the terminal may select in priority the second battery of the second terminal to provide power to the terminal. This extends a time period in which the terminal and the second terminal cooperate, and also extends a time period in which the terminal operates independently.

The method may preferably further include a step in which the second control unit controls the second battery unit to provide power to the second terminal.

In this embodiment, the second battery unit may be used to provide power to the second terminal while providing power to the terminal.

The first condition may preferably include that a predicted operation duration of the second terminal is longer than that of the terminal. This may be determined by any one of the following conditions:

a ratio between the second energy information and the second power information is greater than a ratio between the first energy information and the first power information; and a ratio between the second energy information and the first energy information is greater than a ratio between the second power information and the first power information.

The method may preferably further include controlling, by the first control unit, the first switching unit to select the first battery unit for providing power to the terminal, when the first energy information, the first power information, the second energy information and the second power information satisfy a second condition. The second condition may include that a predicted operation duration of the second terminal is shorter than or equal to that of the terminal. This may be determined by any one of the following conditions:

a ratio between the second energy information and the second power information is smaller than or equal to a ratio between the first energy information and the first power information; and a ratio between the second energy information and the first energy information is smaller than or equal to a ratio between the second power information and the first power information.

Preferably, the method may further include the following steps.

The first control unit determines whether the obtained first energy information reaches a preset energy threshold, and if YES, controls the first switching unit to select the second battery unit for providing power to the terminal.

If the first energy information does not reach the preset energy threshold, and the first energy information, the first power information, the second energy information and the second power information satisfy the first condition, the first control unit controls the first switching unit to select the second battery unit for providing power to the terminal.

If the first energy information does not reach the preset energy threshold, and the first energy information, the first power information, the second energy information and the second power information satisfy the second condition, the first control unit controls the first switching unit to select the first battery unit for providing power to the terminal.

In this embodiment, after obtaining the first energy information, the first control unit may first determine whether the first energy information reaches a preset energy threshold. If the first energy information reaches the preset energy threshold, it indicates that the remaining power level of the first battery unit is low. Then, the first control unit may directly control the first switching unit to select the second battery unit for providing power to the terminal. At the same time, the second battery unit may also provide power to the second terminal.

Preferably, the first power information of the first battery unit and the second power information of the second battery unit may be obtained in real time, or obtained at a regular basis in order to reduce the frequency of power switching. The power information may be obtained by measuring or estimate power. This may particularly includes the following processes.

The first control unit obtains a first voltage and a first current output from the first battery unit, and obtains the first power information of the terminal based on a product of the first voltage and the first current; the first control unit also obtains a second voltage and a second current output from the second battery unit, and obtains the second power information of the second terminal based on a product of the second voltage and the second current.

Alternatively, the first control unit obtains a first, current operation mode of the terminal, and obtains the first power information of the terminal based on the first operation mode; the first control unit also obtains a second, current operation mode of the second terminal, and obtains the second power information of the second terminal based on the second operation mode.

For example, the first control unit may look up a database of operation modes based on the number/type of currently executed programs (including, for example, only a text edition program being executed, only a media playback program being executed, a web browser being executed, or multiple programs of different types being executed) and/or the number/type of currently operated hardware components (including, for example, whether a display component is working, or a network communication component is working), and obtain a corresponding power.

The above process of looking up a database of operation modes and obtaining a corresponding power will be described below by taking a terminal (Base part) and a second terminal (Slate part) as example.

In this embodiment, several operation modes and corresponding power consumption values are defined for Slate. The power consumption value is 3 W for Modem mode (in which the display component is operating, and network communication related components are operating), and the power consumption value is 0.2 W for Suspend mode (or Standby mode). Different normal operation modes may have different power consumption values. For example, the power consumption value is 3.2 W for text processing mode (in which hardware components operate normally, while only a text processing application is running on the operating system (OS)). The power consumption value is 4.2 W for video playback mode (in which hardware components operate normally, while only a media playback application is running on the OS). The power consumption value is 3.5 W for web browsing mode (in which hardware components operate normally, while only a web browsing application is running on the operating system (OS)). Similarly, several operation modes and corresponding power consumption values are defined for Base. For example, the power consumption value is 10 W for text processing mode, the power consumption value is 10 W for video playback mode, and the power consumption value is 12 W for web browsing mode.

Figure 27:
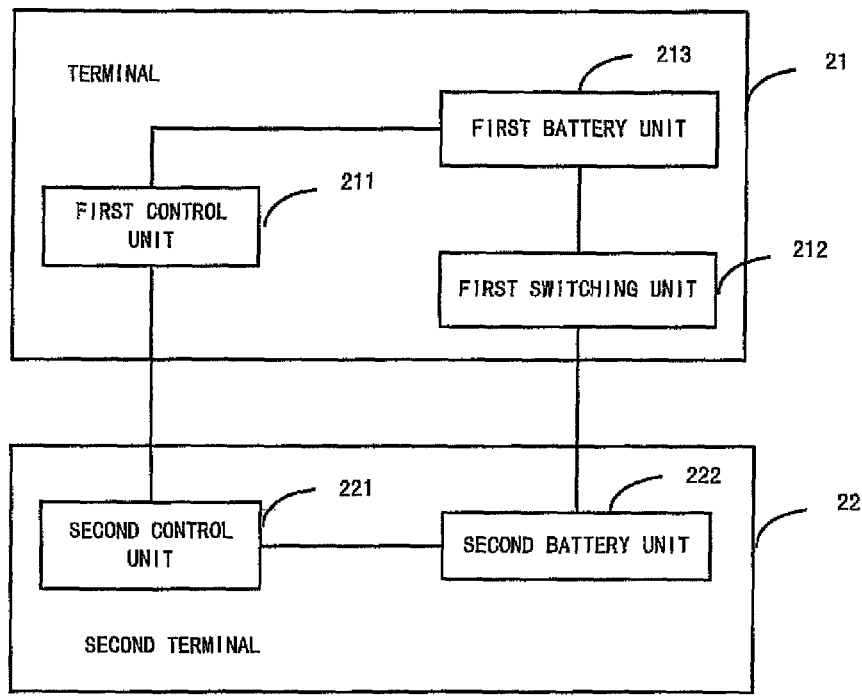
FIG. 27 is a schematic block diagram of a terminal according to an embodiment of the present invention.

FIG. 27 is a schematic block diagram of a terminal according to an embodiment of the present invention. The terminal 21 is coupled to a second terminal 22 including a second control unit 221 and a second battery unit 222 coupled to the second control unit 221. The terminal 21 includes a first control unit 211, a first switching unit 212 and a first battery unit 213. The first control unit 211 is coupled to each of the second control unit 221, the first switching unit 212 and the first battery unit 213. The first switching unit 212 is coupled to each of the first battery unit 213 and the second battery unit 222.

The first control unit 211 is configured to obtain first power information of the terminal 21 and first energy information about remaining power level of the first battery unit 213. The first control unit 211 is also configured to obtain, via the second control unit 221, second power information of the second terminal 22 and second energy information about remaining power level of the second battery unit 222. The first control unit 211 is further configured to control the first switching unit 212 to select the second battery unit 222 for providing power to the terminal 21, when it determines that the first energy information, the first power information, the second energy information and the second power information satisfy a first condition.

Alternatively, the first control unit 211 is configured to control the first switching unit 212 to select the first battery unit 212 for providing power to the terminal 21, when it determines that the first energy information, the first power information, the second energy information and the second power information satisfy a second condition.

Alternatively, the first control unit 211 is further configured to determine whether the obtained first energy information reaches a preset energy threshold (for example, but not limited to, 3% of the total battery energy, or battery energy corresponding to 3% of the total battery energy), and if YES, to control the first switching unit 212 to select the second battery unit 222 for providing power to the terminal 21.

If the first energy information does not reach the preset energy threshold, and the first energy information, the first power information, the second energy information and the second power information satisfy the first condition, the first control unit 211 controls the first switching unit 212 to select the second battery unit 221 for providing power to the terminal 21.

If the first energy information does not reach the preset energy threshold, and the first energy information, the first power information, the second energy information and the second power information satisfy the second condition, the first control unit 211 controls the first switching unit 212 to select the first battery unit 213 for providing power to the terminal 21.

Alternatively, the terminal 21 may further include a first charging unit coupled to the first switching unit and the first control unit and configured to charge the first battery unit via the first switching unit.

An embodiment of the present invention also provides another terminal including a first hardware system and a second hardware system. The first hardware system includes the same units as those in the terminal of the above embodiment. That is, the first hardware system includes a first control unit, a first switching unit and a first battery unit. The first control unit is coupled to each of the second control unit, the first switching unit and the first battery unit. The first switching unit is coupled to the first battery unit. The second hardware system includes the same units as those in the second terminal of the above embodiment. That is, the second hardware system includes a second control unit and a second battery unit coupled to the second control unit and the first switching unit. The second control unit is coupled to the first control unit.

The first control unit is configured to obtain first power information of the first hardware system and first energy information about remaining power level of the first battery unit, and to obtain, via the second control unit, second power information of the second hardware system and second energy information about remaining power level of the second battery unit. The first control unit is configured to control the first switching unit to select the second battery unit for providing power to the first hardware system, when it determines that the first energy information, the first power information, the second energy information and the second power information satisfy a first condition.

Preferably, the second control unit is configured to control the second battery unit to provide power to the second hardware system.

Preferably, the first hardware system may further include a first charging unit coupled to the first switching unit and the first control unit and configured to charge the first battery unit via the first switching unit.

The second hardware system may further include a second charging unit coupled to the second battery unit and the second control unit and configured to charge the second battery unit.

Below specific application examples are described as appreciated by those skilled in the art.

Figure 28:
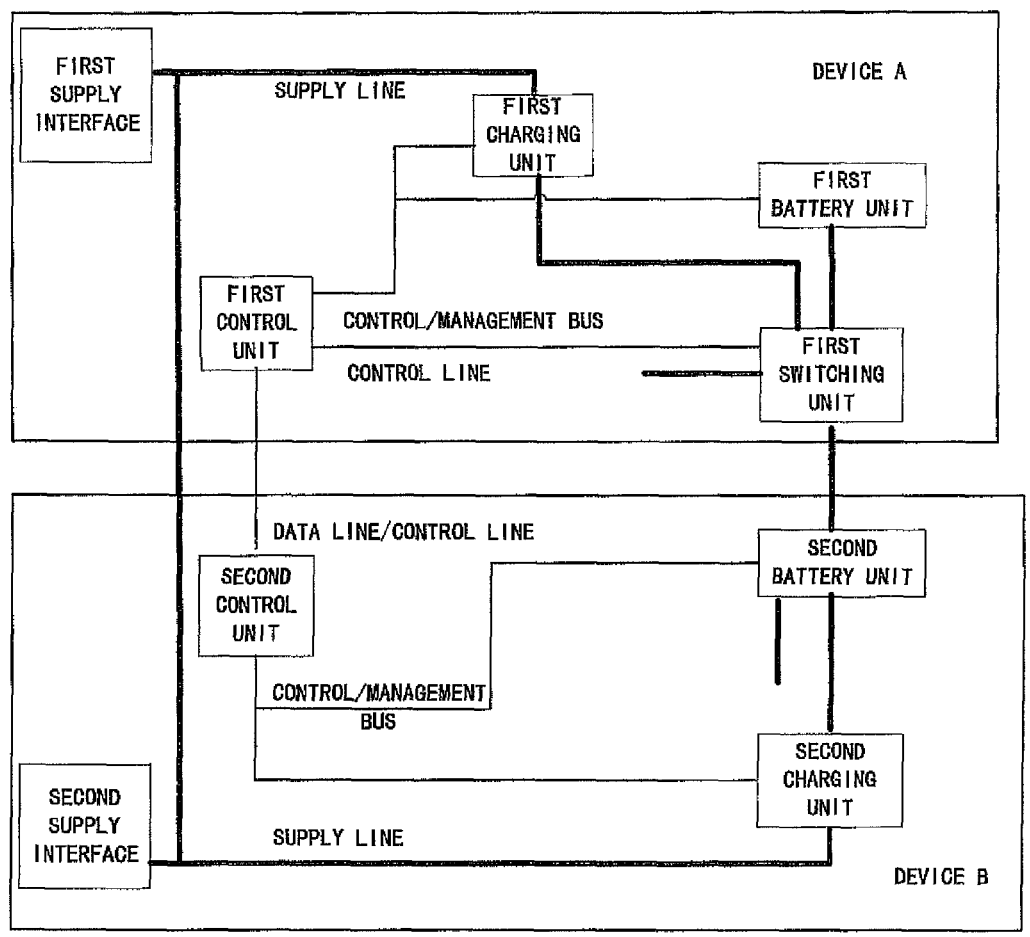
FIG. 28 is a schematic logical diagram showing power supply when terminals A and B are coupled according to an embodiment of the present invention.

FIG. 28 is a schematic logical diagram showing power supply when terminals A and B are coupled according to an embodiment of the present invention. In this embodiment, terminals A and B may be coupled in various connection manners including wired, wireless or hybrid connection. The wired connection may refer to data and power transfer via a wired mechanism including a physical interface (e.g., slot-type or contact-type interface) and a physical line (e.g., a USB connection line). The wired connection is not limited thereto, but may include other types of connections. The wireless connection may refer to data and power transfer via a wireless mechanism including data transfer over Bluetooth, and wirelessly charging/discharging through electromagnetic sensing. The wireless connection is not limited thereto, but may include other types of connections. The hybrid connection may refer to transferring data wirelessly while transferring power over a wire, or transferring data over a wire while transferring power wirelessly.

As shown in the figure, terminal A includes a first control unit, a first switching unit and a first charging unit. Terminal B includes a second control unit, a second battery unit and a second charging unit. The second control unit is coupled to the second battery unit and the second charging unit via a control/management bus, and the second battery unit is coupled to the second charging unit. The first control unit is coupled to the second control unit via a data line or a control line, to the first switching unit via a control line, and to each of the first battery unit and the charging unit via a control/management bus. The first switching unit is coupled to each of the first battery unit and the second battery unit. A first supply interface is coupled to a second supply interface, and also to the first charging unit via a supply line. The second supply interface is coupled to the second charging unit via a supply line.

In this embodiment, terminal A estimates its predicted operation duration and the predicted operation duration of terminal B. If a result of comparison between these predicted operation durations satisfies a first condition, the first control unit controls the first switching unit to select the second battery unit for providing power to the terminal. The first condition may be that the predicted operation duration of terminal B is longer than that of terminal A. For example, comparison between the predicted operation durations may be realized by comparing a ratio between the second energy information and the second power information with a ratio between the first energy information and the first power information, or by comparing a ratio between the second energy information and the first energy information with a ratio between the second power information and the first power information.

If the result of comparison between these predicted operation durations satisfies a second condition, the first control unit controls the first switching unit to select the first battery unit for providing power to the terminal. The second condition may be that the predicted operation duration of terminal B is shorter than or equal to that of terminal A. Comparison between the predicted operation durations may be realized in a way similar to that described above.

In this embodiment, terminal A may further include a display unit, and may operate independently, for example, as a slate. Terminal B may further include a display unit, and may operate independently. Terminal B may not include a display unit (e.g., the Base part of a notebook computer), and may operate independently. If terminal B is a stand-alone device and has no display unit, terminals A and B, after being coupled together, may constitute a combined device of a notebook type, and the display unit of terminal A may display operation results of terminal B.

Figure 29:
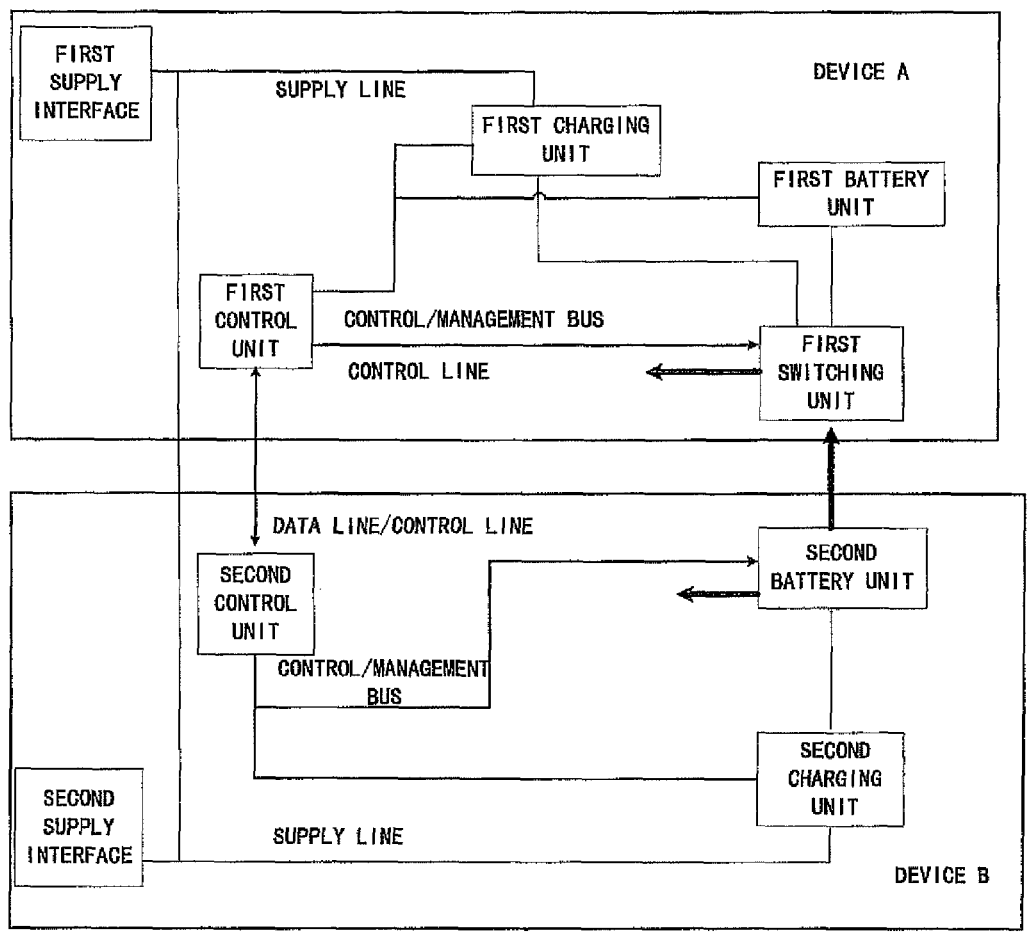
FIG. 29 is a schematic logical diagram showing that a battery of terminal B supplies power to terminals A and B according to an embodiment of the present invention.

FIG. 29 is a schematic logical diagram showing that a battery of terminal B supplies power to terminals A and B according to an embodiment of the present invention. Units and connections therebetween of terminals A and B in this embodiment are the same as shown in FIG. 3, and details thereof are omitted here.

In this embodiment, the first control unit obtains first power information of terminal A and first energy information about remaining power level of the first battery unit. The first control unit also obtains, via the second control unit, second power information of terminal B and second energy information about remaining power level of the second battery unit. The first control unit controls the first switching unit to select the second battery unit for providing power to terminal A, when it determines that the first energy information, the first power information, the second energy information and the second power information satisfy a first condition. At the same time, the second control unit controls the second battery unit to provide power to terminal B.

The first condition may be determined by determining that a ratio between the second energy information and the second power information is greater than a ratio between the first energy information and the first power information, or that a ratio between the second energy information and the first energy information is greater than a ratio between the second power information and the first power information. The present embodiment is not limited thereto.

That is, when a predicted operation duration of terminal B is longer than that of terminal A (i.e., the first condition), the first control unit of terminal A may control the first switching unit to select the second battery unit for providing power to terminal A. This extends a time period in which terminals A and B cooperate, and also extends a time period in which terminal A operates independently.

Further, in this embodiment, the second charging unit may charge the second battery unit in time, and the first charging unit may charge the first battery unit.

Figure 30:
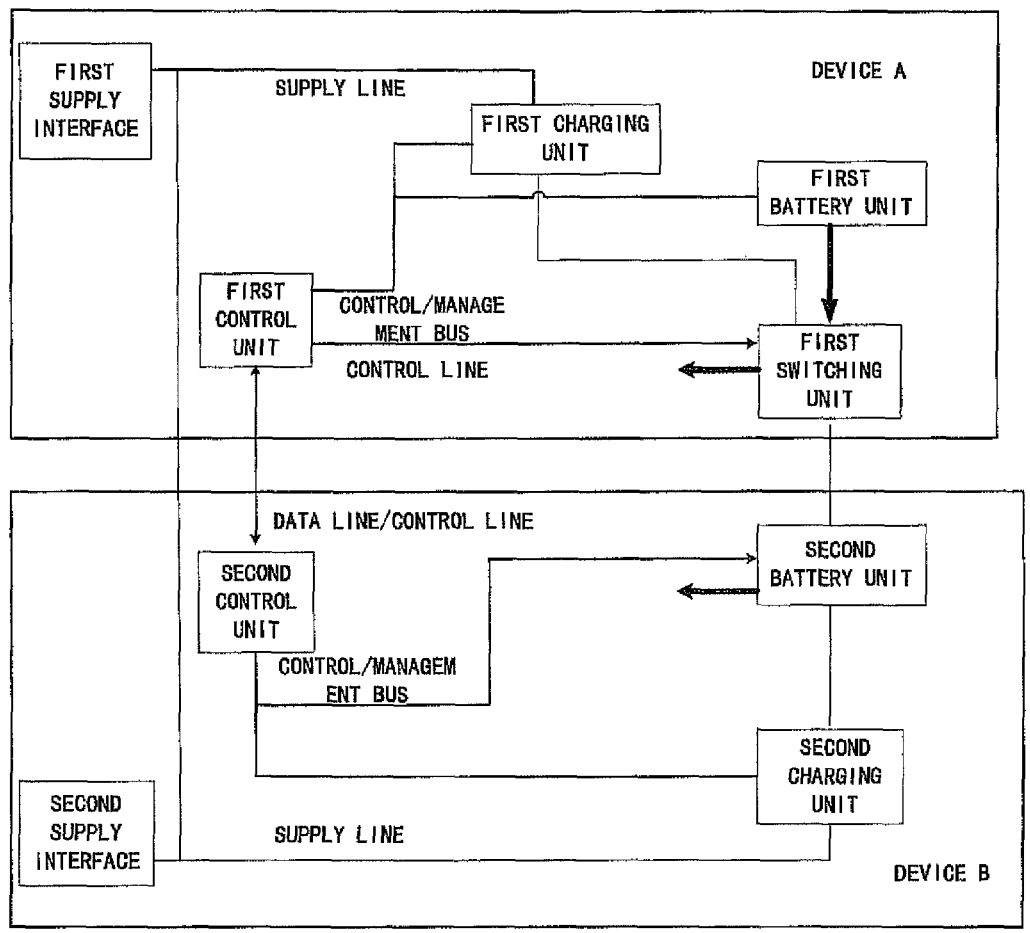
FIG. 30 is a schematic logical diagram showing that batteries of terminals A and B supply power to terminals A and B, respectively, according to an embodiment of the present invention.

FIG. 30 is a schematic logical diagram showing that batteries of terminals A and B supply power to terminals A and B, respectively, according to an embodiment of the present invention. Units and connections therebetween of terminals A and B in this embodiment are the same as shown in FIG. 28, and details thereof are omitted here.

The first control unit controls the first switching unit to select the first battery unit for providing power to terminal A, when it determines that the first energy information, the first power information, the second energy information and the second power information satisfy a second condition.

That is, when a predicted operation duration of terminal B is shorter than or equal to that of terminal A (i.e., the second condition), the first control unit of terminal A may control the first switching unit to select the first battery unit for providing power to terminal A. This extends a time period in which terminal A operates independently, while maintaining a time period in which terminals A and B cooperate.

Figure 31:
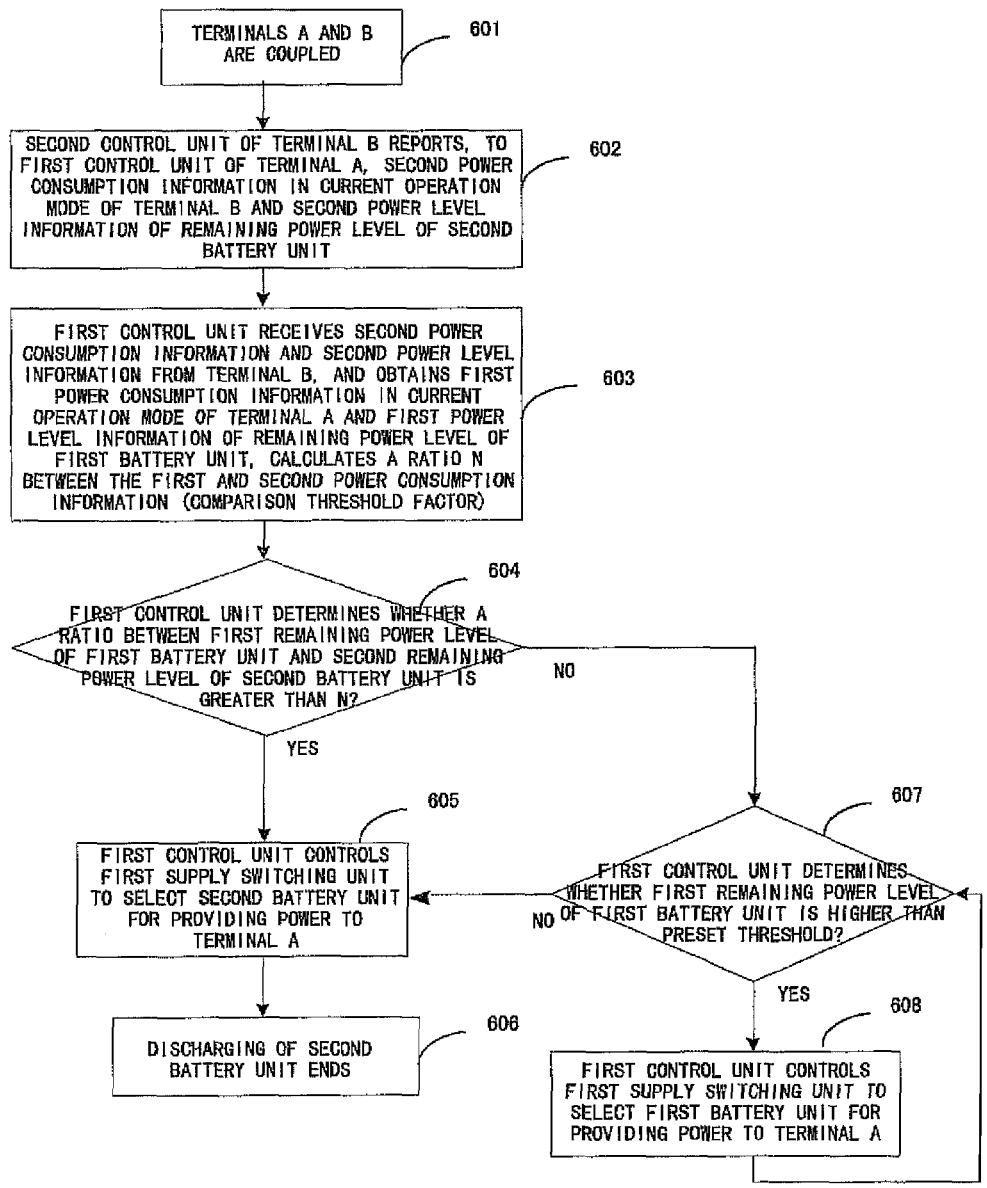
FIG. 31 is a flow chart showing applications of power supply when terminals A and B are coupled according to an embodiment of the present invention.

FIG. 31 is a flow chart showing applications of power supply when terminals A and B are coupled according to an embodiment of the present invention. Units and connections therebetween of terminals A and B in this embodiment are the same as shown in FIG. 28, and details thereof are omitted here. This embodiment is described by taking as example that the first condition is a ratio between the second energy information and the first energy information being greater than a ratio between the second power information and the first power information. The embodiment, however, is not limited thereto. The first energy information is functionally equivalent to the first power consumption information, and the first switching unit is functionally equivalent to the first supply switching unit. The method may include the following steps.

Step 601: terminals A and B are coupled together.

Step 602: the second control unit of terminal B reports, to the first control unit of terminal A, the second power consumption information in the current operation mode of terminal B and the second power level information indicating the remaining power level of the second battery unit.

Step 603: the first control unit receives the second power consumption information and the second power level information from terminal B, and obtains the first power consumption information in the current operation mode of terminal A and the first power level information indicating the remaining power level of the first battery unit. The first control unit calculates a ratio N between the first and second power consumption information, i.e., a comparison threshold factor.

Step 604: the first control unit determines whether a ratio between the first remaining power level of the first battery unit and the second remaining power level of the second battery unit is greater than N, and if YES, the flow proceeds to step 605; otherwise, the flow proceeds to step 607.

Step 605: the first control unit controls the first supply switching unit to select the second battery unit for providing power to terminal A.

Step 606: the discharging of the second battery unit ends.

Step 607: the first control unit determines whether the first remaining power level of the first battery unit is higher than a preset threshold, and if YES, the flow proceeds to step 608; otherwise, the flow returns to step 607.

Step 608: the first control unit controls the first supply switching unit to select the first battery unit for providing power to terminal A.

In the above embodiments, when terminals A and B are coupled together, the second control unit of terminal B reports in real time, to the first control unit of terminal A, the second power consumption information in the current operation mode of terminal B and the second power level information indicating the remaining power level of the second battery unit. After obtaining the second power consumption information and the second power level information from terminal B the first control unit of terminal A determines whether the first energy information, the first power information, the second energy information and the second power information satisfy the first or second condition by performing calculations according to a certain algorithm based on the second power consumption information and the second power level information as well as the first power consumption information in the current operation mode of terminal A and the first power level information indicating the remaining power level of the first battery unit. If the first condition is satisfied, the first control unit controls the first supply switching unit to select the second battery unit for providing power to terminal A. If the second condition is satisfied, the first control unit controls the first supply switching unit to select the first battery unit for providing power to terminal A. In this way, this embodiment extends a time period in which terminal A operates independently while extending a time period in which terminals A and B cooperate. That is, in addition to extending the cooperation time period of terminals A and B as much as possible, the present embodiment maintains as much as possible the battery energy of terminal A which does not share its battery, and thus extends the independent operation time of terminal A.

Below specific application examples are described as appreciated by those skilled in the art.

In this example, Base and Slate are coupled together. The fully-charged power level of the battery in Slate is 25 wh, and the fully-charged power level of the battery in Base is 27 wh. The power consumption of Slate is constant at 3 w, while the power consumption of Base is constant at 9 w.

When the remaining power level of Slate battery is 5 w, the control unit of Slate will obtain the current remaining power level of Base battery and the current power consumption value of Base if Slate and Base are coupled.

In this case, if the remaining power level of Base battery is 20 w, the control unit of Slate will control the switching unit to use Base battery for providing power to Slate. At the same time, the Base battery also provides power to Base. Then, Base battery provides power to both Base and Slate. When the power level of Base battery decreases to 15 w, the control unit of Slate controls the switching unit to use Slate battery for providing power to Slate. Accordingly, Slate battery provides power to Slate, while Base battery provides power to Base.

When Slate battery is discharged to a power level of 0.75 w (3%*25 wh), the control unit of Slate controls the switching unit to use Base battery again for providing power to Slate, until Base battery is fully discharged due to providing power to both Base and Slate.

In addition to extending the cooperation time period of Base and Slate, the present embodiment maintains as much as possible the battery energy of Slate which does not share its battery, and thus extends the independent operation time of Slate.

Herein, terms such as "first" and "second" are only for distinguishing an entity or operation from another one, other than specifying or implying certain sequence of these entities or operations. Terms "comprise," "include" and any variants thereof are not exclusive. That a process, method, article or device includes some elements means that such process, method, article or device may include additional or intrinsic elements other than the explicitly listed elements. The phase "including an element" does not exclude that more than one such element is included.

Based on the description of exemplary embodiments, those skilled in the art will understand that the exemplary embodiments may be implemented in a general hardware platform programmed with software, or entirely in hardware. The former implementation is preferred in most cases. The exemplary embodiments may be implemented in the form of computer software product which can be stored in some storage medium, such as ROM/RAM, magnetic disk, optical disk. The computer software product may include instructions that cause a computer (e.g., PC, server or network device) to execute methods according to some of the exemplary embodiments or part thereof.

While some embodiments of the present invention have been described, it should be noted that many changes and modifications can be made by those skilled in the art without departing from the principle of the present invention. These changes and modifications are encompassed by the scope of the present invention.

What is claimed is:

1. A terminal coupled to a second terminal comprising a second switching unit, a second charging unit and a second battery unit, wherein the second charging unit is coupled to the second battery unit, the terminal comprises a first switching unit and a first battery unit, wherein the first switching unit is coupled to each of the second switching unit and the first battery unit, the second terminal further comprises a second processing unit coupled to each of the second battery unit, the first battery unit and the first switching unit and configured to obtain first status information of the first battery unit and second status information of the second battery unit, and to transmit the control instruction or control signal to the first switching unit based on the first and/or second status information, and wherein the first switching unit is configured to receive the control instruction or a control signal, and to switch to the second switching unit based on the control instruction or the control signal so as to supply power to the second terminal with the first battery unit, or switch to the second charging unit based on the control instruction or the control signal so as to charge the second battery unit with the first battery unit, the terminal further comprises a first processing unit coupled to each of the first battery unit and the second switching unit and configured to obtain first power information of the terminal and first energy information about remaining power level of the first battery unit, to obtain, via the second processing unit, second power information of the second terminal and second energy information about remaining power level of the second battery unit, and the first processing unit is further configured to determine whether the obtain first energy information is lower than a preset energy threshold, to control the first switching unit to select the second battery unit for providing power to the terminal if the obtain first energy information is lower than the preset energy threshold, and if the obtain first energy information is not lower than the preset energy threshold, to control the first switching unit to select the second battery unit for providing power to the terminal when the first energy information, the first power information, the second energy information and the second power information satisfy the first condition, or to control the first switching unit to select the first battery unit for providing power to the terminal, when the first energy information, the first power information, the second energy information and the second power information satisfy the second condition.

2. The terminal of claim 1, wherein the second switching unit is coupled to each of the second charging unit and the second battery unit,
the first switching unit switches to the second switching unit based on the received control instruction or control signal, and causes the second switching unit to connect the second charging unit with the second battery unit such that the second charging unit charges the second battery unit.

3. The terminal of claim 1, wherein the second terminal further comprises a second processing unit coupled to the second battery unit, and
the terminal further comprises a first processing unit coupled to each of the first battery unit and the second switching unit and configured to obtain first status information of the first battery unit, to obtain second status information of the second battery unit via the second processing unit, and to transmit the control instruction or control signal to the first switching unit based on the first and/or second status information.

4. The terminal of claim 1, wherein the first processing unit is configured to obtain first power information of the terminal and first energy information about remaining power level of the first battery unit, to obtain, via the second processing unit, second power information of the second terminal and second energy information about remaining power level of the second battery unit, and to control the first switching unit to select the second battery unit for providing power to the terminal, when it determines that the first energy information, the first power information, the second energy information and the second power information satisfy a first condition.

5. The terminal of claim 4, wherein the first processing unit is configured to control the first switching unit to select the first battery unit for providing power to the terminal, when it determines that the first energy information, the first power information, the second energy information and the second power information satisfy a second condition.

6. A terminal system comprising a first hardware system and a second hardware system, the first hardware system comprises a first switching unit and a first battery unit coupled with each other, and the second hardware system comprises a second switching unit, a second charging unit and a second battery unit, wherein each of the second switching unit and the second charging unit is coupled to the first switching unit, and the second charging unit is further coupled to the second battery unit,
the second hardware system further comprises a second processing unit coupled to each of the second battery unit, the first battery unit and the first switching unit and configured to obtain first status information of the first battery unit and second status information of the second battery unit, and to transmit the control instruction or control signal to the first switching unit based on the first and/or second status information,
wherein the first switching unit is configured to receive the control instruction or a control signal, and to switch to the second switching unit or the second charging unit based on the control instruction or the control signal;
the second switching unit is configured to, when switching to the first switching unit, supply power to the second hardware system with the first battery unit; and
the second charging unit is configured to, when switching to the first switching unit, charging the second battery unit with the first battery unit,
the first hardware system further comprises a first processing unit coupled to each of the first battery unit and the second switching unit and configured to obtain first power information of the first hardware system and first energy information about remaining power level of the first battery unit, to obtain, via the second processing unit, second power information of the second hardware system and second energy information about remaining power level of the second battery unit, and the first processing unit is further configured to determine whether the obtain first energy information is lower than a preset energy threshold, to control the first switching unit to select the second battery unit for providing power to the first hardware system if the obtain first energy information is lower than the preset energy threshold, and
if the obtain first energy information is not lower than the preset energy threshold,
to control the first switching unit to select the second battery unit for providing power to the first hardware system when the first energy information, the first power information, the second energy information and the second power information satisfy the first condition, or
to control the first switching unit to select the first battery unit for providing power to the first hardware system, when the first energy information, the first power information, the second energy information and the second power information satisfy the second condition.

7. The terminal system of claim 6, wherein the second switching unit is coupled to each of the second charging unit and the second battery unit,
the first switching unit switches to the second switching unit based on the received control instruction or control signal, and
when the first switching unit switches to the second switching unit, the second switching unit connects the second charging unit with the second battery unit such that the second charging unit charges the second battery unit.

8. The terminal system of claim 6, wherein the first hardware system further comprises a first processing unit coupled to the first battery unit, the second hardware system further comprises a second processing unit coupled to the second battery unit, and the first processing unit is coupled to the second processing unit,
the first processing unit is configured to obtain first status information of the first battery unit, to obtain second status information of the second battery unit via the second processing unit, and to transmit the control instruction or control signal to the first switching unit based on the first and/or second status information,
the second processing unit is configured to obtain the second status information of the second battery unit, to obtain the first status information of the first battery unit via the first processing unit, and to transmit the control instruction or control signal to the first switching unit based on the first and/or second status information.

9. A terminal coupled to a first terminal comprising a first switching unit and a first battery unit coupled with each other, the terminal comprises a second processing unit, a second switching unit, a second charging unit and a second battery unit, the second processing unit is coupled to each of the second battery unit, the first battery unit and the second switching unit, the second charging unit is coupled to each of the second battery unit and the first switching unit, and the second switching unit is coupled to the first switching unit, wherein the second processing unit is configured to obtain a first status information of the first battery unit, obtain a second status information of the second battery unit, and based on the first status information and/or the second status information, to control the first switching unit to switch to the second switching unit so as to supply power to the terminal with the first battery unit, or to control the first switching unit to switch to the second charging unit so as to charge the second battery unit with the first battery unit, or to control the first switching unit to switch to the second charging unit so as to charge the first battery unit with the second battery unit, the first terminal further comprises a first processing unit coupled to each of the first battery unit and the second switching unit and configured to obtain first power information of the first terminal and first energy information about remaining power level of the first battery unit, to obtain, via the second processing unit, second power information of the terminal and second energy information about remaining power level of the second battery unit, and the first processing unit is further configured to determine whether the obtain first energy information is lower than a preset energy threshold, to control the first switching unit to select the second battery unit for providing power to the first terminal if the obtain first energy information is lower than the preset energy threshold, and if the obtain first energy information is not lower than the preset energy threshold, to control the first switching unit to select the second battery unit for providing power to the first terminal when the first energy information, the first power information, the second energy information and the second power information satisfy the first condition, or to control the first switching unit to select the first battery unit for providing power to the first terminal, when the first energy information, the first power information, the second energy information and the second power information satisfy the second condition.

10. The terminal of claim 9, wherein the second switching unit is coupled to each of the second charging unit and the second battery unit, the second processing unit is further configured to control the first switching unit to switch to the second switching unit, and to cause the second switching unit to connect the second charging unit with the second battery unit such that the second charging unit charges the second battery unit.

11. A charging/discharging method for a terminal coupled to a second terminal and comprising a first switching unit and a first battery unit coupled with each other, the second terminal comprises a second switching unit, a second charging unit and a second battery unit, the second charging unit is coupled to each of the first switching unit and the second battery unit, the second switching unit is coupled to the first switching unit, wherein the method comprises:

receiving, by the first switching unit, a control instruction or a control signal from a second processing unit in the second terminal which is coupled to the second battery unit, the first battery unit, and the first switching unit respectively, and switching to the second switching unit based on the control instruction or the control signal so as to supply power to the second terminal with the first battery unit, or switching to the second charging unit based on the control instruction or the control signal so as to charge the second battery unit with the first battery unit, the terminal further comprises a first processing unit coupled to each of the first battery unit and the second switching unit and configured to obtain first power information of the terminal and first energy information about remaining power level of the first battery unit, to obtain, via the second processing unit, second power information of the second terminal and second energy information about remaining power level of the second battery unit, and the first processing unit is further configured to determine whether the obtain first energy information is lower than a preset energy threshold, to control the first switching unit to select the second battery unit for providing power to the terminal if the obtain first energy information is lower than the preset energy threshold, and if the obtain first energy information is not lower than the preset energy threshold, to control the first switching unit to select the second battery unit for providing power to the terminal when the first energy information, the first power information, the second energy information and the second power information satisfy the first condition, or to control the first switching unit to select the first battery unit for providing power to the terminal, when the first energy information, the first power information, the second energy information and the second power information satisfy the second condition.

12. A charging/discharging method for a terminal system comprising a first hardware system and a second hardware system, the first hardware system comprises a first switching unit and a first battery unit coupled with each other, and the second hardware system comprises a second switching unit, a second charging unit and a second battery unit, wherein each of the second switching unit and the second charging unit is coupled to the first switching unit, and the second charging unit is further coupled to the second battery unit, wherein the method comprises:

receiving, by the first switching unit, a control instruction or a control signal from a second processing unit in the second hardware system which is coupled to the second battery unit, the first battery unit, and the first switching unit respectively, and switching to the second switching unit or the second charging unit based on the control instruction or the control signal;

supplying, by the second switching unit when switching to the first switching unit, power to the second hardware system with the first battery unit; and charging, by the second charging unit when switching to the first switching unit, the second battery unit with the first battery unit, the first hardware system further comprises a first processing unit coupled to each of the first battery unit and the second switching unit and configured to obtain first power information of the first hardware system and first energy information about remaining power level of the first battery unit, to obtain, via the second processing unit, second power information of the second hardware system and second energy information about remaining power level of the second battery unit, and the first processing unit is further configured to determine whether the obtain first energy information is lower than a preset energy threshold, to control the first switching unit to select the second battery unit for providing power to the first hardware system if the obtain first energy information is lower than the preset energy threshold, and if the obtain first energy information is not lower than the preset energy threshold, to control the first switching unit to select the second battery unit for providing power to the first hardware system when the first energy information, the first power information, the second energy information and the second power information satisfy the first condition, or to control the first switching unit to select the first battery unit for providing power to the first hardware system, when the first energy information, the first power information, the second energy information and the second power information satisfy the second condition.

13. A charging/discharging method for a terminal coupled to a first terminal comprising a first switching unit and a first battery unit coupled with each other, the terminal comprises a second processing unit, a second switching unit, a second charging unit and a second battery unit, the second processing unit is coupled to each of the second battery unit, the first battery unit and the second switching unit, the second charging unit is coupled to each of the second battery unit and the first switching unit, and the second switching unit is coupled to the first switching unit, wherein the method comprises:

obtaining, by the second processing unit, a first status information of the first battery unit, obtaining a second status information of the second battery unit, and based on the first status information and/or the second status information, controlling the first switching unit to switch to the second switching unit so as to supply power to the terminal with the first battery unit, or controlling the first switching unit to switch to the second charging unit so as to charge the second battery unit with the first battery unit, or controlling the first switching unit to switch to the second charging unit so as to charge the first battery unit with the second battery unit, the first terminal further comprises a first processing unit coupled to each of the first battery unit and the second switching unit and configured to obtain first power information of the first terminal and first energy information about remaining power level of the first battery unit, to obtain, via the second processing unit, second power information of the terminal and second energy information about remaining power level of the second battery unit, and the first processing unit is further configured to determine whether the obtain first energy information is lower than a preset energy threshold, to control the first switching unit to select the second battery unit for providing power to the first terminal if the obtain first energy information is lower than the preset energy threshold, and if the obtain first energy information is not lower than the preset energy threshold, to control the first switching unit to select the second battery unit for providing power to the first terminal when the first energy information, the first power information, the second energy information and the second power information satisfy the first condition, or to control the first switching unit to select the first battery unit for providing power to the first terminal, when the first energy information, the first power information, the second energy information and the second power information satisfy the second condition.

14. A discharging method for a terminal coupled to a second terminal and comprising a first battery unit, the second terminal comprises a second battery unit and a second charging unit, the method comprises:

receiving, by the terminal, a control instruction or a control signal from a second processing unit in the second hardware system;

based on the control instruction or the control signal, using, by the terminal, the first battery unit to supply power to the second terminal, or using the second charging unit to charge the second battery unit of the second terminal, the second terminal further comprises the second processing unit coupled to each of the second battery unit, the first battery unit and a first switching unit and configured to obtain first status information of the first battery unit and second status information of the second battery unit, and to transmit the control instruction or control signal to the first switching unit based on the first and/or second status information, and the terminal further comprises a first processing unit coupled to each of the first battery unit and a second switching unit in the second terminal and configured to obtain first power information of the terminal and first energy information about remaining power level of the first battery unit, to obtain, via the second processing unit, second power information of the second terminal and second energy information about remaining power level of the second battery unit, and the first processing unit is further configured to determine whether the obtain first energy information is lower than a preset energy threshold, to control the first switching unit to select the second battery unit for providing power to the terminal if the obtain first energy information is lower than the preset energy threshold, and if the obtain first energy information is not lower than the preset energy threshold, to control the first switching unit to select the second battery unit for providing power to the terminal when the first energy information, the first power information, the second energy information and the second power information satisfy the first condition, or to control the first switching unit to select the first battery unit for providing power to the terminal, when the first energy information, the first power information, the second energy information and the second power information satisfy the second condition.

* * * * *